United States Patent
Katsuragi

(10) Patent No.: US 9,272,557 B2
(45) Date of Patent: Mar. 1, 2016

(54) IMAGE FORMING METHOD AND IMAGE FORMING APPARATUS

(71) Applicant: Koji Katsuragi, Kanagawa (JP)

(72) Inventor: Koji Katsuragi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 5 days.

(21) Appl. No.: 14/326,808

(22) Filed: Jul. 9, 2014

(65) Prior Publication Data

US 2015/0022582 A1    Jan. 22, 2015

(30) Foreign Application Priority Data

Jul. 17, 2013    (JP) .................. 2013-148407

(51) Int. Cl.
*B41J 2/015*    (2006.01)
*B41M 5/00*    (2006.01)
*C09D 193/00*    (2006.01)

(52) U.S. Cl.
CPC ........... *B41M 5/0017* (2013.01); *C09D 193/00* (2013.01)

(58) Field of Classification Search
None
See application file for complete search history.

(56) References Cited

U.S. PATENT DOCUMENTS

| 8,382,271 B2 | 2/2013 | Goto et al. |
| 2004/0252169 A1 | 12/2004 | Chen et al. |
| 2011/0279517 A1 | 11/2011 | Katsuragi |
| 2012/0113195 A1 | 5/2012 | Katsuragi |
| 2012/0169815 A1 | 7/2012 | Katsuragi |
| 2012/0229558 A1 | 9/2012 | Nishizaki et al. |

(Continued)

FOREIGN PATENT DOCUMENTS

| JP | 3799253 | 4/2006 |
| JP | 4194531 | 10/2008 |
| JP | 2012-187771 | 10/2012 |

(Continued)

OTHER PUBLICATIONS

U.S. Appl. No. 14/060,690, filed Oct. 23, 2013.

*Primary Examiner* — Lisa M Solomon
(74) *Attorney, Agent, or Firm* — Cooper & Dunham LLP

(57) ABSTRACT

Provided is an image forming method, including: applying a treatment liquid to a recording medium; and applying a recording ink to the recording medium. The treatment liquid is free from a colorant, and contains an organic acid salt or a cationic resin or both thereof, a water-soluble organic solvent, and water. The water-soluble organic solvent contains one or more selected from sodium poly-γ-glutamate, N-acyl fatty acid-sodium L-glutamate, sodium N-lauroyl-L-aspartate, and a compound represented by General Formula 1 below. The recording ink contains a colorant, a water-soluble organic solvent, a surfactant, a carboxyl group-containing resin, and water.

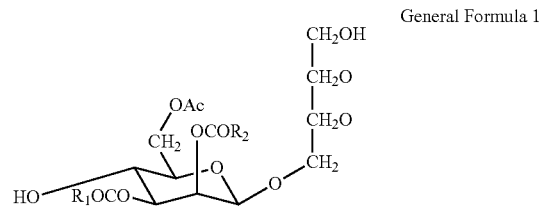

General Formula 1 where in General Formula 1 above, Ac represents an acetyl group, and $R_1$ and $R_2$ each represent a fatty acid residue having 8 to 14 carbon atoms.

12 Claims, 6 Drawing Sheets

(56) References Cited

U.S. PATENT DOCUMENTS

2013/0063524 A1 3/2013 Katoh et al.
2013/0321524 A1 12/2013 Katsuragi

FOREIGN PATENT DOCUMENTS

| JP | 2013-244601 | 12/2013 | |
| WO | WO2012108368 A1 * | 8/2012 | ............ C09D 11/30 |

* cited by examiner

IMAGE FORMING METHOD AND IMAGE FORMING APPARATUS

BACKGROUND OF THE INVENTION

1. Field of the Invention

The present invention relates to an image forming method and an image forming apparatus using a treatment liquid and a recording ink.

2. Description of the Related Art

In an inkjet recording system, means for improving image density by pre-coating a recording medium with a treatment liquid and bringing a water-based recording ink into contact with the treatment liquid to thereby agglutinate the colorant is commonly known. As a component for agglutinating the colorant in the water-based recording ink, polyvalent metal salts and cationic resins are known. However, problems remain in the conventional art as to storage stability and various safety properties of the treatment liquid itself.

For example, there are proposals for adding an amino acid such as glycine and alanine to the treatment liquid (see Japanese Patent Application Laid-Open (JP-A) No. 2012-187771 and Japanese Patent (JP-B) Nos. 4194531 and 3799253). However, according to these proposals, there are problems in storage stability of the treatment liquid, when the treatment liquid is used in a system configured to apply the treatment liquid under open air.

A water-soluble organic solvent such as glycerin is generally used as a humectant of the treatment liquid. However, although no particular significant problem arises under hermetical conditions of a certain degree such as in a head, water evaporation is heavy in a system in which coating of the treatment liquid is performed under open air, which causes great changes in the properties of the treatment liquid. Further, a highly hydrophilic organic solvent is generally used in order to be dissolved in water, which is the main component. This consequently fosters curling of a recording medium.

SUMMARY OF THE INVENTION

An object of the present invention is to provide an image forming method using a treatment liquid that can secure storage stability and curling resistance while maintaining an ability to agglutinate a colorant in a recording ink.

To solve the problems described above, an image forming method of the present invention includes:

applying a treatment liquid to a recording medium;

applying a recording ink to the recording medium, wherein the treatment liquid is free from a colorant, and contains an organic acid salt or a cationic resin or both thereof, a water-soluble organic solvent, and water, wherein the water-soluble organic solvent contains one or more selected from sodium poly-γ-glutamate, N-acyl fatty acid-sodium L-glutamate, sodium N-lauroyl-L-aspartate, and a compound represented by General Formula 1 below, and wherein the recording ink contains at least a colorant, a water-soluble organic solvent, a surfactant, a carboxyl group-containing resin, and water:

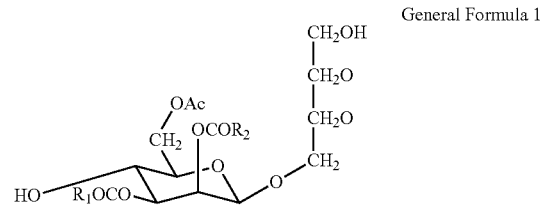

General Formula 1 where in General Formula 1 above, Ac represents an acetyl group, and $R_1$ and $R_2$ each represent a fatty acid residue having 8 to 14 carbon atoms.

The present invention can provide an image forming method that can solve the conventional problems described above and that uses a treatment liquid that can secure storage stability and curling resistance while maintaining an ability to agglutinate a colorant in a water-based recording ink.

Figure 1:
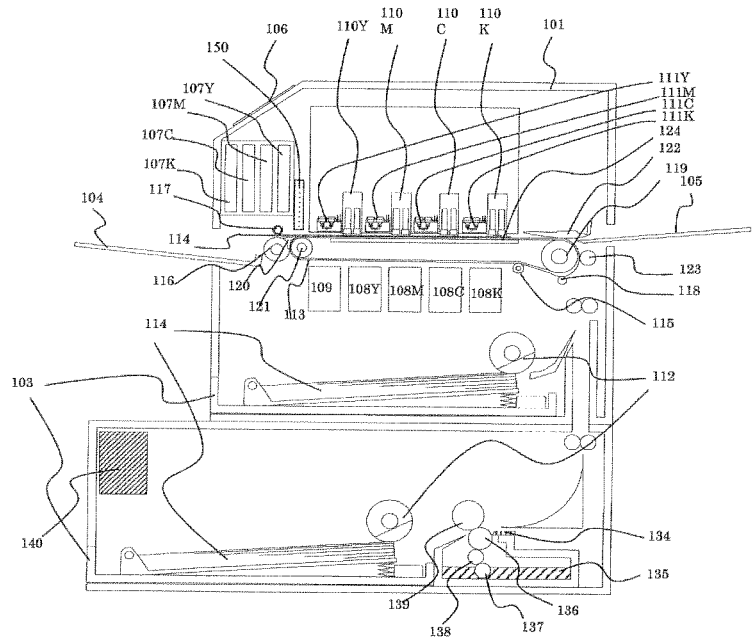
FIG. 1 is an exemplary diagram showing an example of an image forming apparatus of the present invention.

DETAILED DESCRIPTION OF THE INVENTION (Image Forming Method and Image Forming Apparatus)

An image forming method of the present invention includes a treatment liquid applying step and a recording ink applying step, and further includes other steps according to necessity.

An image forming apparatus of the present invention includes a treatment liquid applying unit and a recording ink applying unit, and further includes other units according to necessity.

The image forming method of the present invention can be preferably carried out by the image forming apparatus of the present invention. The treatment liquid applying step can be performed by the treatment liquid applying unit. The recording ink applying step can be performed by the recording ink applying unit. The other steps can be performed by the other units.

<Treatment Liquid Applying Step and Treatment Liquid Applying Unit>

The treatment liquid applying step is a step of applying a treatment liquid to a recording medium, and can be performed by the treatment liquid applying unit.

A method for applying the treatment liquid to a recording medium is preferably any of a liquid discharging method and a coating method.

The liquid discharging method is not particularly limited and may be appropriately selected according to the purpose. A method for driving a discharging head may be a method with a piezoelectric element actuator using a PZT, etc., a method of applying thermal energy, a method of using an on-demand head using an actuator utilizing an electrostatic force, and a method of using a continuous-jetting charge-controlling type head.

Examples of the coating method include a blade coating method, a gravure coating method, a gravure offset coating method, a wire bar coating method, a bar coating method, a roller coating method, a knife coating method, an air knife coating method, a comma coating method, a U-comma coating method, an AKKU coating method, a smoothing coating method, a micro gravure coating method, a reverse roller coating method, a coating method with 4 or 5 rollers, a dip coating method, a curtain coating method, a slide coating method, and a die coating method. Among these, the wire bar coating method and the roller coating method are particularly preferable.

The amount of deposition of the treatment liquid onto a recording medium in the treatment step is preferably from 0.1 g/m² to 30.0 g/m², and more preferably from 0.2 g/m² to 10.0 g/m².

When the amount of deposition is less than 0.1 g/m², substantially no improvement may be observed in the image quality. When it is greater than 30.0 g/m², the drying property of the treatment liquid may be poor particularly on a recording medium having a poor ink absorbability, which may cause curling.

<<Treatment Liquid>>

The treatment liquid is free from a colorant, contains an organic acid salt or a cationic resin or both thereof, a water-soluble organic solvent, and water, preferably contains a surfactant and a foam suppressor, and further contains other components according to necessity.

—Water-Soluble Organic Solvent—

Glycerin is generally used as the water-soluble organic solvent of the treatment liquid, in view of environmental concerns, cost-efficiency, and sustainability of the properties of each liquid component. However, water evaporation is heavy in a system in which coating is performed under open air, which causes great changes in the properties of the treatment liquid. Further, glycerin, etc. are highly hydrophilic because of their structures. Therefore, when discharged onto a recording medium, they may disconnect hydrogen bonds in cellulose together with water, which may result in troubles such as curling and cockling. There are water-soluble organic solvents such as 3-methyl-1,3-butanediol that are more or less greater in hydrophobicity than glycerin. A water-soluble organic solvent having a greater hydrophobicity improves a film forming property on a resin and curling resistance, but makes storage stability much poorer than when glycerin is used. Therefore, it has been impossible so far to satisfy storage stability, curling resistance, etc. at the same time.

In this regard, the present invention has succeeded in satisfying storage stability and curling resistance at the same time by using as a water-soluble organic solvent having a high moisture retaining property, one or more selected from sodium poly-γ-glutamate, N-acyl fatty acid-sodium L-glutamate, sodium N-lauroyl-L-aspartate, and a compound represented by General Formula 1 below.

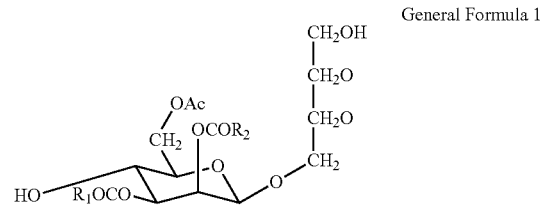

General Formula 1 where in General Formula 1 above, Ac represents an acetyl group, and $R_1$ and $R_2$ each represent a fatty acid residue having 8 to 14 carbon atoms.

The water-soluble organic solvent having a high moisture retaining property contains a hydrophilic group and a hydrophobic group in the structure thereof. Therefore, it is less likely to disconnect hydrogen bonds in cellulose than general water-soluble organic solvents, which will result in improved curling resistance. Sodium poly-γ-glutamate can retain about twice more water than hyaluronic acid can, and has a molecular size that is 1/3,000 of collagen. Therefore, the amount of the water-soluble organic solvent to remain undried on the surface of a recording medium will be suppressed, which will result in excellent scratching resistance. A cross-linked product of sodium poly-γ-glutamate may also be used.

One kind of a water-soluble organic solvent having a high moisture retaining property may be used alone, but it is preferable to use any other water-soluble organic solvent in combination, because this would result in better moisture retaining property.

Examples of the other water-soluble organic solvent include polyhydric alcohols, polyhydric alcohol alkyl ethers, polyhydric alcohol aryl ethers, nitrogen-containing heterocyclic compounds, amides, amines, sulfur-containing compounds, propylene carbonate, and ethylene carbonate.

Examples of the polyhydric alcohols include glycerin, 1,3-butanediol, 3-methyl-1,3-butanediol, 1,5-pentanediol, 1,6-hexanediol, ethylene glycol, diethylene glycol, triethylene glycol, tetraethylene glycol, polyethylene glycol, propylene glycol, dipropylene glycol, tripropylene glycol, polypropylene glycol, hexylene glycol, trimethylolethane, trimethylolpropane, 1,2,3-butanetriol, 1,2,4-butanetriol, 1,2,6-hexanetriol, and 3-methyl-1,3,5-pentanetriol.

Examples of the polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyhydric alcohol aryl ethers include ethylene glycol monophenyl ether and ethylene glycol monobenzyl ether.

Examples of the nitrogen-containing heterocyclic compounds include 2-pyrrolidone, N-methyl-2-pyrrolidone, N-hydroxyethyl-2-pyrrolidone, 1,3-dimethyl imidazolidinone, ε-caprolactam, and γ-butyrolactone.

Examples of the amides include acetamide, dimethylformamide, and diethylacetamide.

Examples of the amines include monoethanolamine, diethanolamine, triethanolamine, monoethylamine, diethylamine, and triethylamine.

Examples of the sulfur-containing compounds include dimethylsulfoxide, sulfolane, and thiodiethanol.

Among these other water-soluble organic solvents, glycerin, diethylene glycol, 1,3-butanediol, and 3-methyl-1,3-butanediol are particularly preferable. They have excellent effects in solubility and in resistance against jetting property failure due to water evaporation. It is also possible to prepare a treatment liquid having excellent storage stability and discharging stability with them.

The content of the water-soluble organic solvent in the treatment liquid is preferably from 1% by mass to 30% by mass, and more preferably from 5% by mass to 20% by mass.

—Organic Acid Salt (Organic Acid and Neutralizer)—

The role of organic acid in the present invention is to agglutinate a colorant on a recording medium through a reaction with a carboxyl group-containing resin in the recording ink.

It is preferable that the organic acid contain a carboxyl group. Organic acids are produced in vivo or contained in foods, etc., and scarcely remain in a human body, and many of them are odorless. Therefore, they are suitable for use in image forming apparatuses in homes and offices. Specifically, lactic acid, malic acid, acetic acid, succinic acid, tartaric acid, citric acid, ascorbic acid, etc. are preferable, and lactic acid is particularly preferable.

The content of the organic acid in the treatment liquid is preferably from 1% by mass to 30% by mass, and more preferably from 10% by mass to 20% by mass. When the content is too high, the effect of agglutinating a colorant through a reaction with a carboxyl group-containing resin in the water-based recording ink is excessive, which results in a small dot diameter on a recording medium. This means that the spread of a dot is narrow, which leads to a trouble that the background color of the recording medium surfaces in the image, particularly where a solid portion is filled insufficiently. Therefore, it is necessary to determine the additive amount of the organic acid within a range in which troubles will not occur in the image.

It is preferable to add a neutralizer for neutralizing the organic acid, because the organic acid alone would lower the pH of the treatment liquid and bring about a problem of corrosion against any metallic members.

Specific examples of the neutralizer include the components represented by Structural Formulae 2 to 7 below.

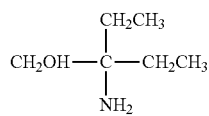
(Structural Formula 2)

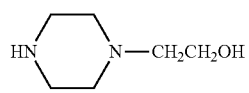
(Structural Formula 3)

$NH_2(CH_2)_2NHCH_2CH_2OH$
(Structural Formula 4)

(Structural Formula 5)

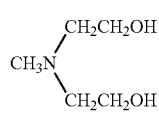
(Structural Formula 6)

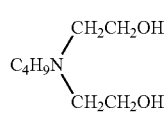

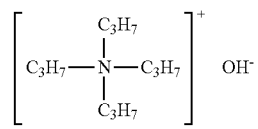
(Structural Formula 7)

The additive amount of the neutralizer depends on the kind of the organic acid with which it is combined, and the neutralizer is added until the pH of the treatment agent reaches from neutral levels to alkaline levels (about pH of from 7 to 9 for a rough standard).

—Cationic Resin—

A cationic resin is used in the treatment liquid mainly for the purpose of fixing the recording ink on the surface of a recording medium through a charge-based effect.

Examples of the cationic resin include those that contain the repeating units represented by General Formulae 8 to 10 below.

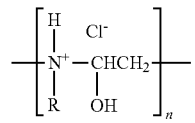
General Formula 8

R: —H, or —$CH_3$, or —$C_2H_5$

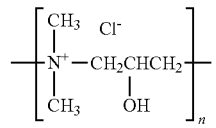
General Formula 9

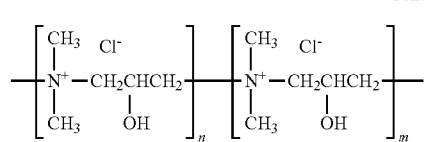
General Formula 10 where in General Formulae 8 to 10 above, n and m represent the number of repeating units, and are integers of 1 or greater.

The weight average molecular weight of the cationic resin of General Formula 8 above is preferably about 4,000. The weight average molecular weight of the cationic resin of General Formula 9 above is preferably about 1,500. The weight average molecular weight of the cationic resin of General Formula 10 above is preferably about 7,000.

The cationic resin is not particularly limited, and may be an appropriately synthesized product or may be a commercially available product. Examples of commercially available products include DK6810 manufactured by Seiko PMC Corporation, CATIOMASTER PDT-2 manufactured by Yokkaichi Chemical Company, Limited, and LEOGUARD KGP manufactured by Lion Corporation.

The content of the cationic resin in the treatment liquid is preferably from 10% by mass to 40% by mass. When the content is too low, a colorant agglutinating effect on the surface of a recording medium is poor, which may cause beading. When the content is too high, the colorant agglutinating effect is too high, which may cause a problem such as an insufficiently filled solid portion.

A cationic resin having a higher cationic degree has greater cationic properties, and can react with the colorant in the recording ink efficiently, can consequently suppress the amount of the treatment liquid to be required, and can produce a high-quality image without causing curling and cockling of the recording medium. Therefore, the cationic degree of the cationic resin is preferably 5 or greater. When the cationic degree is too low, the colorant agglutinating effect on the surface of a recording medium will be poor, which causes beading.

Cationic degree can be obtained by colloid titration using a potassium polyvinyl sulfate reagent. A detailed procedure is as follows.

Deionized water (90 mL) is weighed out in a conical beaker, a 500 ppm aqueous solution of the sample (on the dried basis) (10 mL) is added thereto, the pH is adjusted to 4.0 with an aqueous solution of a hydrochloric acid, and they are stirred for about 1 minute. Next, 2 to 3 droplets of a toluidine blue indicator are added thereto, and the resultant is titrated with an N/400 potassium polyvinyl sulfate reagent (N/400 PVSK). The titration rate is 2 mL/minute. The titration is terminated when the sample water is retained for 10 seconds or longer after it turns colors from blue to magenta. The calculation formula of the cationic degree (meq/g) is as follows.

Cationic degree=(Titer of N/400 PVSK)×(Factor of N/400 PVSK)/2

—Surfactant—

It is preferable to add a surfactant to the treatment liquid in order to suppress the surface tension of the treatment liquid. One of the characteristics required of the treatment liquid used in the present invention is an appropriate wettability to various types of recording media and uniform dischargeability. With an appropriate wettability, the penetration speed of the treatment liquid into various types of recording media can be high, and scratching resistance and problems such as bleeding can be improved. Particularly, penetrability of the treatment liquid into various types of recording media is very important. When penetrability is low, much of the treatment liquid stops at about the surface of a recording medium. Then, when the treatment liquid contacts the recording ink containing a colorant on the recording medium, the carboxyl group-containing resin that embraces the colorant in the recording ink causes an excessive agglutination effect due to the organic acid, etc. in the treatment liquid, which leads to insufficient filling of a solid image due to a small dot diameter. Further, because the colorant component excessively stays on the surface of the recording medium, troubles may also occur in fixing, etc.

For these reasons, it is common to suppress the surface tension by adding a surfactant in order to improve wettability.

It is preferable that the surfactant contain a fluoroalkyl group, because such a surfactant can make the surface tension greatly low when the treatment liquid is water-soluble.

At least one selected from a compound represented by Structural Formula 13 below and polyoxyalkylene alkyl ether is preferable as the surfactant.

Structural Formula 13

The compound represented by Structural Formula 13 above contains neither PFOS (perfluorooctanesulfonic acid) nor PFOA (perfluorooctanoic acid), and is excellent in terms of geoenvironmental contamination.

The content of the surfactant in the treatment liquid is preferably from 0.01% by mass to 4% by mass, and more preferably from 0.1% by mass to 1% by mass. When the content is less than 0.01% by mass, there may be no effect of adding the surfactant. When the content is greater than 4% by mass, penetrability to a recording medium may be more than necessary, which may lead to a problem such as degradation of image density.

<<Foam Suppressor>>

The surface activating ability of the surfactant represented by Structural Formula 13 above is very high. Therefore, even when a commonly used silicone-based foam suppressor is added, air bubbles that are once generated will not disappear but persist. Therefore, a discharging failure is likely to occur when the ink is discharged. Hence, a foam suppressor for suppressing generation of air bubbles is added to the treatment liquid used in the present invention.

At least one selected from N-octyl-2-pyrrolidone, 2,4,7,9-tetramethyldecane-4,7-diol, and 2,5,8,1-tetramethyldodecane-5,8-diol is preferable as the foam suppressor. Such a foam suppressor, when used in combination with the fluorosurfactant described above, can suppress generation of air bubbles and solve troubles due to air bubbles.

The surface tension of the treatment liquid used in the present invention is determined by the ratio between the surfactant and the foam suppressor. When it is necessary to lower the surface tension of the treatment liquid depending on the type of a recording medium, it is necessary to increase the ratio of the surfactant. However, needless to say, when the ratio of the surfactant is increased, the problem of bubbling arises. Therefore, the ratio of the surfactant is preferably 40% by mass or less, and more preferably 30% by mass or less relative to the sum total of the surfactant and the foam suppressor.

—Water—

Examples of the water to be contained in the treatment liquid include pure water or ultrapure water such as ion-exchanged water, ultrafiltration water, reverse osmosis water, and distilled water.

The content of the water in the treatment liquid is preferably 60% by mass or less, and more preferably from 30% by mass to 50% by mass. When the content is too high, viscosity build-up, gelation, or deposition of an insoluble component may occur in the treatment liquid when the water is evaporated.

<Recording Ink Applying Step and Recording Ink Applying Unit>

The recording ink applying step is a step of applying a recording ink to a recording medium, and is performed by the recording ink applying unit.

A method for applying the recording ink to the recording medium may be a liquid discharging method, a coating method, etc. Among these, the liquid discharging method is preferable.

The liquid discharging method is not particularly limited and may be appropriately selected according to the purpose. A method for driving a discharging head may be a method with a piezoelectric element actuator using a PZT, etc., a method of applying thermal energy, a method of using an on-demand head using an actuator utilizing an electrostatic force, and a method of using a continuous-jetting charge-controlling type head.

Examples of the coating method include a blade coating method, a gravure coating method, a gravure offset coating method, a wire bar coating method, a bar coating method, a roller coating method, a knife coating method, an air knife coating method, a comma coating method, a U-comma coating method, an AKKU coating method, a smoothing coating method, a micro gravure coating method, a reverse roller coating method, a coating method with 4 or 5 rollers, a dip coating method, a curtain coating method, a slide coating method, and a die coating method.

<<Recording Ink>>

The recording ink contains at least a colorant, a water-soluble organic solvent, a surfactant, a carboxyl group-containing resin, and water, and further contains other components according to necessity.

—Colorant—

The colorant is not particularly limited, and dyes and pigments publicly known for recording inks may be used. Colorant particles obtained by coating inorganic particles with an organic pigment or carbon black may also be used.

A method for coating the inorganic particles with carbon black may be a liquid drying method based on coagulation and deposition, a dry mixing method of applying a mechanical force during mixing, etc. A method for coating the inorganic particles with an organic pigment may be a method of depositing the organic pigment in the presence of the inorganic particles, a method of mechanically mixing and attriting the inorganic particles and the organic pigment, etc. In this case, it is possible to use a chemical vapor deposition technique when using an organic pigment having excellent thermal stability to coat the inorganic particles. Further, according to necessity, an organosilane compound layer made of polysiloxane and alkylsilane may be formed between the inorganic particles and the organic pigment, which will result in improved adhesiveness between them.

Examples of the inorganic particles include titanium dioxide, silica, alumina, iron oxide, iron hydroxide, and tin oxide. The shape of the inorganic particles preferably has a small aspect ratio, and is particularly preferably a spherical shape. When adsorbing a colored colorant to the surface of the inorganic particles, the color of the inorganic particles is preferably clear and colorless, or white. However, when adsorbing a black colorant, black inorganic particles may be used.

The primary particle diameter of the inorganic particles is preferably 100 nm or less, and more preferably from 5 nm to 50 nm.

Examples of the organic pigment to coat the inorganic particles include, as for black pigments, carbon black and aniline black. As for color pigments, examples thereof include anthraquinone, phthalocyanine blue, phthalocyanine green, diazo, monoazo, pyranthrone, perylene, heterocyclic yellow, quinacridone, and (thio)indigoid.

Among these, phthalocyanine-based pigments, quinacridone-based pigments, monoazo yellow-based pigments, diazo yellow-based pigments, and heterocyclic yellow pigments are particularly preferable in terms of chromogenic performance.

Examples of phthalocyanine-based pigments include copper phthalocyanine blue or derivatives thereof (C.I pigment blue 15:3, C.I pigment blue 15:4), and aluminum phthalocyanine.

Examples of quinacridone-based pigments include C.I pigment orange 48, C.I pigment orange 49, C.I pigment red 122, C.I pigment red 192, C.I pigment red 202, C.I pigment red 206, C.I pigment red 207, C.I pigment red 209, C.I pigment violet 19, and C.I pigment violet 42.

Examples of monoazo yellow-based pigments include C.I pigment yellow 74, C.I pigment yellow 109, C.I pigment yellow 128, and C.I pigment yellow 151.

Examples of diazo yellow-based pigments include C.I pigment yellow 14, C.I pigment yellow 16, and C.I pigment yellow 17.

Examples of heterocyclic yellow pigments include C.I pigment yellow 117, and C.I pigment yellow 138.

The mass ratio between the inorganic particles and the organic pigment or carbon black as the colorant (inorganic particles:colorant) is preferably from 3:1 to 1:3, and more preferably from 3:2 to 1:2. When the ratio of the colorant is too small, chromogenic performance and coloring performance may be poor. When the ratio of the colorant is too large, transparency and color tone may be poor.

Examples of commercially available products of colorant particles in which the inorganic particles are coated with an organic pigment or carbon black include a silica/carbon black composite material, a silica/phthalocyanine C.I pigment blue 15:3 composite material, a silica/diazo yellow composite material, and a silica/quinacridone C.I pigment red 122 composite material manufactured by TodaKogyo Corp. These products have a small primary particle diameter and can be used suitably.

For example, when inorganic particles having a primary particle diameter of 20 nm are coated with an equal amount of an organic pigment, the primary particle diameter of the resulting particles will be about 25 nm. Hence, if use of an appropriate dispersant can allow the inorganic particles to be dispersed as they are in their primary particle state, an ink in which very fine pigment particles with a dispersion particle diameter of 25 nm are dispersed can be produced.

The primary particle diameter of the colorant particles is preferably from 5 nm to 100 nm, and more preferably from 30 nm to 80 nm in the water-based recording ink. When the primary particle diameter is less than 5 nm, the viscosity of the ink may build up or the colorant particles may aggregate during long-term storage of the ink. When the primary particle diameter is greater than 100 nm, a printed product of the ink on a medium such as paper, a film, etc., may have poor chromaticness and brightness. The primary particle diameter of the colorant particles means the minimum unit of the colorant particles to no smaller than which the particles can be pulverized with mechanical shearing.

The content of the colorant particles in the recording ink is preferably from 1% by mass to 20% by mass, and more preferably from 2% by mass to 15% by mass.

—WaterSoluble Organic Solvent—

Water is used as a solvent of a recording ink. A water-soluble organic solvent is used in combination, for the purposes of preventing drying of the ink, improving dispersion stability, etc. A plurality of kinds of water-soluble organic solvents may be mixed and used.

The same water-soluble organic solvents as those listed for the treatment liquid may be used as the water-soluble organic solvent. Among these, glycerin, diethylene glycol, 1,3-butanediol, and 3-methyl-1,3-butanediol are particularly preferable. They have excellent effects in solubility and in resistance against jetting property failure due to water evaporation. It is also possible to prepare a recording ink having excellent storage stability and discharging stability with them.

The mass ratio between the colorant and the water-soluble organic solvent greatly influences the discharging stability of the ink. When the amount of the solid pigment content is large but the content of the water-soluble organic solvent is small, water evaporation will have become heavy in the vicinity of the nozzle, resulting in a discharging failure.

It is also possible to use in combination with the water-soluble organic solvent, any other water-soluble organic solvent such as sugars and derivatives thereof, or a wetting agent in the recording ink according to necessity. Sugars are mainly used for improving drying resistance, and examples thereof include monosaccharides, disaccharides, oligosaccharides (including trisaccharides and tetrasaccharides), and polysaccharides, or derivatives thereof. Specific examples include glucose, mannose, fructose, ribose, xylose, trehalose, and maltotriose. Here, polysaccharides mean sugars in the broad sense of the term, and include substances that exist in abundance in the nature such as α-cyclodextrin and cellulose.

Examples of the derivatives of the sugars include reducing sugars and oxidizing sugars of the sugars. Among these, sugar alcohol is preferable, and specific examples thereof include maltitol and sorbit.

The content of the water-soluble organic solvent is preferably from 0.1% by mass to 40% by mass, and more preferably from 0.5% by mass to 30% by mass relative to the whole content of the recording ink.

—Surfactant—

A surfactant used for the recording ink is not particularly limited and may be appropriately selected according to the purpose from surfactants with which dispersion stability will not be spoiled depending on the kind of the colorant and on combination with the water-soluble organic solvent, a penetrant, etc. For printing on a recording medium, the surfactant is preferably a fluorosurfactant or a silicone-based surfactant having a low surface tension and a high leveling property. Of these, a fluorosurfactant is particularly preferable.

Examples of the fluorosurfactant that are preferable in terms of a low foaming property include perfluoroalkyl sulfonic acid compound, perfluoroalkyl carboxylic acid compound, perfluoroalkyl phosphate compound, a perfluoroalkyl ethylene oxide adduct, and polyoxyalkylene ether polymer compound having a perfluoroalkyl ether group in the side chain.

Examples of the perfluoroalkyl sulfonic acid compound include perfluoroalkyl sulfonic acid and perfluoroalkyl sulfonic acid salt.

Examples of the perfluoroalkyl carboxylic acid compound include perfluoroalkyl carboxylic acid and perfluoroalkyl carboxylic acid salt.

Examples of the perfluoroalkyl phosphate compound include perfluoroalkyl phosphate and perfluoroalkyl phosphate salt.

Examples of the polyoxyalkylene ether polymer compound having a perfluoroalkyl ether group in the side chain include a sulfate salt of polyoxyalkylene ether polymer having a perfluoroalkyl ether group in the side chain, and a salt of polyoxyalkylene ether polymer having a perfluoroalkyl ether group in the side chain.

Examples of counter ion for the salt of these fluorosurfactants include Li, Na, K, $NH_4$, $NH_3CH_2CH_2OH$, $NH_2(CH_2CH_2OH)_2$, and $NH(CH_2CH_2OH)_3$.

The fluorosurfactant may be an appropriately synthesized product or a commercially available product. Examples of the commercially available product include SURFLON SERIES (S-111, S-112, S-113, S-121, S-131, S-132, S-141, S-145) manufactured by Asahi Glass, Co., Ltd., FLUORAD SERIES (FC-93, FC-95, FC-98, FC-129, FC-135, FC-170C, FC-430, FC-431) manufactured by Sumitomo 3M Limited, MEGAFAC SERIES (F-470, F-1405, F-474) manufactured by DIC Corporation, ZONYL TBS, FSP, FSA, FSN-100, FSN, FSO-100, FSO, FS-300, and UR manufactured by Du Pont Kabushiki Kaisha, FT-110, FT-250, FT-252, FT-400S, FT-150, and FT-400SW manufactured by Neos Company Limited, and PF-151N manufactured by Omnova Solutions Inc. Among these, a fluorosurfactant represented by General Formula 14 below is preferable.

where in General Formula 14 above, n represents an integer of from 2 to 6, a represents an integer of from 15 to 50, Y represents $—C_bH_{2b-1}$ (where b represents an integer of from 11 to 19) or $CH_2CH(OH)CH_2—C_mF_{2m+1}$ (where m represents an integer of from 2 to 6).

Specific examples of the compound represented by General Formula 14 above include the followings represented by Structural Formulae 15 to 20 below. Among these, the compound represented by Structural Formula 16 is preferable.

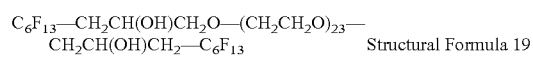

These fluorosurfactants contain neither PFOS (perfluorooctanesulfonic acid) nor PFOA (perfluorooctanoic acid), and are excellent in terms of geoenvironmental contamination.

The silicone-based surfactant is not particularly limited and may be appropriately selected according to the purpose. It is preferably one that does not decompose even at a high pH, and examples thereof include side chain-modified polydimethylsiloxane, both end-modified polydimethylsiloxane, one end-modified polydimethylsiloxane, and side chain both end-modified polydimethylsiloxane. Preferable examples include those that have a polyoxyethylene group or a polyoxyethylene polyoxypropylene group as the modifying group, because such surfactants exhibit favorable properties as an aqueous surfactant.

The silicone-based surfactant may be an appropriately synthesized product or a commercially available product. Examples of commercially available products that are easily available include products manufactured by Byk-Chemie GmbH, Shin-Etsu Silicones Co., Ltd., and Dow Corning Toray Silicone Co., Ltd.

A polyether-modified silicone-based surfactant may also be used as the silicone-based surfactant. Examples thereof include a compound obtained by incorporating a polyalkylene oxide structure into a side chain of a Si site of dimethylsiloxane.

The polyether-modified silicone compound may be an appropriately synthesized product or a commercially available product. Examples of commercially available products include KF-618, KF-642, and KF-643 manufactured by Shin-Etsu Chemical Co., Ltd.

Other than the fluorosurfactant and the silicone-based surfactant, an anionic surfactant, a nonionic surfactant, an amphoteric surfactant, etc. may also be used.

Examples of the anionic surfactant include polyoxyethylene alkylether acetic acid salt, dodecylbenzene sulfonic acid salt, succinic acid ester sulfonic acid salt, lauric acid salt, and polyoxyethylene alkylether sulfate salt.

Examples of the nonionic surfactant include an acethylene glycol-based surfactant, polyoxyethylene alkyl ether, polyoxyethylene alkylphenyl ether, polyoxyethylene alkyl ester, and polyoxyethylene sorbitan fatty acid ester.

Examples of the acethylene glycol-based surfactant include 2,4,7,9-tetramethyl-5-desine-4,7-diol, 3,6-dimethyl- 4-octine-3,6-diol, and 3,5-dimethyl-1-hexine-3-ol. Examples of commercially available products of the acethylene glycol-based surfactant include SURFYNOL SERIES (104, 82, 465, 485, TG) manufactured by Air Products and Chemicals, Inc.

Examples of the amphoteric surfactant include lauryl amino propionic acid salt, lauryl dimethyl betaine, stearyl dimethyl betaine, lauryl dihydroxyethyl betaine, lauryl dimethylamine oxide, myristyl dimethylamine oxide, stearyl dimethylamine oxide, dihydroethyl laurylamine oxide, polyoxyethylene palm oil alkyldimethylamine oxide, dimethylalkyl (palm) betaine, and dimethyl lauryl betaine. Examples of commercially available products of the amphoteric surfactant that are easily available include those that are manufactured by Nikko Chemicals Co., Ltd., Nihon Emulsion Co., Ltd., Nippon Shokubai Co., Ltd., Toho Chemical Industry Co., Ltd., Kao Corporation, Adeka Corporation, Lion Corporation, Aoki Oil Industrial Co., Ltd., and Sanyo Chemical Industries, Ltd.

The various surfactants may be used alone or a plurality of them may be mixed and used. Surfactants may not alone be easily dissolved in the water-based recording ink. However, when a plurality of kinds of them are mixed, they may be solubilized to be able to exist stably.

The content of the surfactant in the recording ink is preferably from 0.01% by mass to 4% by mass, and more preferably from 0.1% by mass to 1% by mass. When the content is less than 0.01% by mass, there may be no effect of adding the surfactant. When the content is greater than 4% by mass, penetrability to a recording medium may be more than necessary, which may lead to degradation of image density and bleed-through.

—Carboxyl Group-Containing Resin—

The recording ink used in the present invention contains a carboxyl group-containing resin. Therefore, the organic acid or a cation polymer in the treatment liquid reacts with the carboxyl group-containing resin in the recording ink to thereby cause agglutination of the pigment on the recording medium, which makes it possible to produce a high-quality image. Note that even when there is no treatment liquid, effects such as improvement of scratching resistance, etc. can be expected from presence of the carboxyl group-containing resin.

Examples of the carboxyl group-containing resin include maleic acid resin, styrene-maleic acid resin, rosin-modified maleic acid resin, alkyd resin, and modified alkyd resin.

Examples of commercially available products thereof include MALKYD SERIES manufactured by Arakawa Chemical Industries, Ltd., HARIMACK SERIES and HARIPHTHAL SERIES manufactured by Harima Chemicals Group, Inc.

The carboxyl group-containing resin may be added, for example, in a form of the colorant being dispersed in the carboxyl group-containing resin, or in a form of the colorant being microcapsulated in the carboxyl group-containing resin.

—Water—

Examples of the water to be added in the recording ink include pure water or ultrapure water such as ion-exchanged water, ultrafiltration water, reverse osmosis water, and distilled water.

—Other Components—

Examples of the other components include a foam suppressor, a penetrant, a polymer particles, a pH adjuster, an antiseptic and mildewcide, and an anticorrosive agent.

The same foam suppressors as those listed for the treatment liquid can be used as the foam suppressor. Particularly, when a fluorosurfactant is used, it is preferable to suppress generation of air bubbles by using a foam suppressor in combination.

The surface tension of the recording ink is determined by the ratio between the surfactant and the foam suppressor. When it is necessary to lower the surface tension of the recording ink depending on the type of a recording medium, it is necessary to increase the ratio of the surfactant. However, needless to say, when the ratio of the surfactant is increased, the problem of bubbling occurs. Therefore, the ratio of the surfactant is preferably 40% by mass or less, and more preferably 30% by mass or less relative to the sum total of the surfactant and the foam suppressor.

A compound that has a boiling point higher than that of water and is liquid at 25° C. is used as the penetrant. Preferable examples thereof include polyol compound having 8 to 11 carbon atoms and glycol ether compound. They have effects of accelerating the penetration speed into a recording medium, and of preventing bleeding at the same time, and they are partially water-soluble compounds having solubility of from 0.1% by mass to 4.5% by mass in water of 25° C.

Examples of the polyol compounds having 8 to 11 carbon atoms include 2,-ethyl-1,3-hexanediol, 2,2,4-trimethyl-1,3-pentanediol, and 1,2,-octanediol.

Examples of the glycol ether compound include polyhydric alcohol alkyl ether compound and polyhydric alcohol aryl ether compound.

Examples of the polyhydric alcohol alkyl ether compound include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyhydric alcohol aryl ether compound include ethylene glycol monophenyl ether and ethylene glycol monobenzyl ether.

The content of the penetrant in the recording ink is preferably from 0.1% by mass to 10% by mass, and more preferably from 0.5% by mass to 5% by mass.

As the polymer particles, those having a film forming property are used. Here, the film forming property means a property of a resin film being formed when the polymer particles are dispersed in water and made into an emulsion and the water component of this aqueous emulsion is evaporated.

With such polymer particles contained, a film is formed by the polymer particles when volatile components in the recording ink are evaporated to serve the function of making the colorant in the recording ink firmly adhere to the recording medium, which makes it possible to realize an image excellent in scratching resistance and water resistance.

The polymer particles preferably have a minimum film forming temperature of 30° C. or lower, and more preferably 10° C. or lower, in order to be able to form a film at room temperature. Here, the minimum film forming temperature means the lowest temperature at which a transparent continuous film can be formed when the polymer particles are dispersed in water, the resulting emulsion is thinly cast on a metal plate made of aluminum or the like, and the temperature is raised. Examples of such polymers include LANDY PL SERIES manufactured by Miyoshi Oil & Fat Co., Ltd.

The volume average particle diameter of the polymer particles is preferably from 5 nm to 200 nm, and more preferably from 10 nm to 100 nm.

The polymer particles may be of a single-particle structure. For example, assume that the emulsion particles contain an alkoxy silyl group. The emulsion particles merge together due to water evaporation in the coating film forming process, and along with this, the alkoxy silyl group comes into contact with water yet to be evaporated and hydrolyzes to thereby form a silanol group. Further, when there remains any silanol group, the alkoxy silyl group reacts with it, or silanol groups themselves react with each other, to be thereby able to form a stiff cross-linked structure based on siloxane linkage. In this way, by making a reactive functional group coexistent in the polymer particles, it is possible to form a network structure without adding a stiffening agent, but by reacting the functional group during the film formation.

It is also possible to use polymer particles having a core-shell structure made of a core portion and a shell portion surrounding it. Here, the core-shell structure means a structure of 2 or more kinds of polymers with different compositions being present in the particles by phase separation. Accordingly, the shell portion needs not completely cover the core portion, but may cover only a portion of the core portion. Further, part of the polymer in the shell portion may form a domain, etc. in the core particles. Furthermore, the core-shell structure may be a 3 or more-layered multilayer structure that further contains 1 or more layers with different compositions between the core portion and the shell portion.

The polymer particles can be obtained by a publicly-known method of, for example, allowing an unsaturated vinyl monomer (or unsaturated vinyl polymer) to undergo emulsion polymerization in water in which a polymerization catalyst and an emulsifier are present.

The content of the polymer particles in the recording ink is preferably from 0.5% by mass to 20% by mass, and more preferably from 1% by mass to 5% by mass. When the content is less than 0.5% by mass, an effect of improving scratching resistance and water resistance may not be exhibited well. When the content is greater than 20% by mass, troubles such as discharging failure may arise due to viscosity build-up and adherence of the polymer component due to drying.

The colorant particles (composite pigment particles) in which the inorganic particles are coated with the organic pigment or carbon black have a strong tendency of showing acidic property when kneaded and dispersed in water together with an anionic dispersant. The surface of the composite pigment dispersed in a medium such as water is charged with negative charges because the surface is surrounded by the anionic dispersant, whereas the inside of the pigment is charged with positive charges because the ink as a whole shows acidic property, which produces conditions under which the negative charges on the surface of the particles are neutralized easily. Under such conditions, the dispersed particles tend to aggregate and cause discharging failure. Therefore, it is preferable to add a pH adjuster and keep the particles alkaline to thereby stabilize the dispersed state and stabilize discharging.

The pH of the recording ink is preferably from 9 to 11. When the pH is greater than 11, the amount of erosion of an ink feeding unit or the like may be large, which leads to problems of ink property alteration, ink leakage, discharging failure, etc.

In adding the pH adjuster, it is preferable to add it together with additives such as the wetting agent, the penetrant, etc. to a liquid resulting from kneading and dispersing the pigment together with the dispersant in water, to add it when kneading and dispersing the pigment together with the dispersant in water. This is because addition of the pH adjuster may destroy the dispersion, depending on the kind of the pH adjuster.

Examples of the pH adjuster include alcohol amines, alkali metal hydroxide, ammonium hydroxide, phosphonium hydroxide, and alkali metal carbonate.

Examples of the alcohol amines include diethanol amine, triethanol amine, and 2-amino-2-ethyl-1,3-propanediol.

Examples of hydroxides of the alkali metal elements include lithium hydroxide, sodium hydroxide, and potassium hydroxide.

Examples of hydroxides of the ammonium include ammonium hydroxide and quaternary ammonium hydroxide.

Examples of hydroxides of the phosphonium include quaternary phosphonium hydroxide.

Examples of carbonates of the alkali metal include lithium carbonate, sodium carbonate, and potassium carbonate.

Examples of the antiseptic and mildewcide include sodium dehydroacetate, sodium sorbate, 2-pyridinethiol-1-oxide sodium, sodium benzoate, and pentachlorophenol sodium.

Examples of the anticorrosive agent include acid sulfite, sodium thiosulfate, ammonium thiodiglycolate, diisopropyl ammonium nitrite, pentaerythritol tetranitrate, and dicyclohexyl ammonium nitrite.

<<Recording Medium>>

A recording medium to which the image forming method of the present invention is applied is not particularly limited and may be appropriately selected according to the purpose. Preferable examples thereof include regular paper, gloss paper, special paper, cloth, film, OHP sheet, and general-purpose printing paper.

<<Ink Cartridge>>

An ink cartridge to be filled with the recording ink is a container for containing an ink, and includes other members appropriately selected according to the purpose, etc. This ink cartridge can also be used as a treatment liquid cartridge when filled with the treatment liquid.

The container is not particularly limited, and the shape, structure, size, material, etc. thereof may be appropriately selected according to the purpose. Examples of the container include a container made of plastic, a container including an ink bag made of aluminum laminate film, etc.

A specific example thereof is one that has the structure described below and shown in FIG. 5 and FIG. 6.

<Other Steps and Other Units>

Examples of the other steps and the other units include a drying step and a drying unit, a storage unit for storing the treatment liquid and a storing step of storing the treatment liquid, and a control step and a control unit for controlling each step.

It is preferable to perform the drying step subsequent to the treatment liquid applying step. It is preferable to provide the drying unit between the treatment liquid applying unit and the recording ink applying unit.

Examples of the drying unit include a roll heater, a drum heater, and hot air. The drying temperature is preferably 60° C. or higher.

Here, FIG. 1 shows an exemplary diagram (a diagram explaining a side surface) of an example of an image forming apparatus.

The image forming apparatus 101 includes head units 110K, 110C, 110M, and 110Y on which heads configured to discharge a water-based recording ink are built up, maintenance units 111K, 111C, 111M, and 111Y corresponding to the head units respectively and configured to do maintenance of the heads, ink cartridges 107K, 107C, 107M, and 107Y configured to supply ink, and sub ink tanks 108K, 108C, 108M, and 108Y configured to store a portion of the ink from the cartridges and supply the ink to the heads at an appropriate pressure.

The image forming apparatus further includes a conveyor belt 113 configured to convey a recording medium 114 by adsorbing it with an adsorbing fan 120, conveying rollers 119 and 121 configured to support the conveyor belt 113, a tension roller 115 configured to control the conveyor belt 113 to be kept at an appropriate tension, a platen 124 and a platen roller 118 configured for the conveyor belt 113 to keep an appropriate flatness, a charging roller 116 configured to apply electrostatic charging for adsorbing a recording medium 114, a sheet discharging mechanism including a sheet discharging roll 117 configured press a recording medium 114 and a sheet discharging tray 104 on which a discharged recording medium 114 is stocked, and a sheet feeding mechanism including a sheet feeding tray 103 on which recording media 114 to be printed are stocked, separate pads 112 and 122 configured to bring forward recording media 114 from the sheet feeding tray sheet by sheet, a counter roller 123 configured to have a recording medium 114, which is carried thereto, adsorbed firmly to a charging belt, and a manual sheet feeding tray 105 used for when feeding sheets manually.

The image forming apparatus also includes a waste fluid tank 109 to which a waste fluid discharged after maintenance is collected, and an operation panel 106 that can display a status of the apparatus when an operation is given to the apparatus.

A line of nozzles of each head unit are arranged perpendicularly to the conveying direction of a recording medium 114, and form a nozzle line having a length equal to or greater than a recording region. Recording media 114 from the sheet feeding tray are separated sheet by sheet by a separating roller, and fixed on the conveyor belt by being brought into firm contact with the conveyor belt by a pressurizing roller. When the recording medium is passed below the head units, liquid droplets are discharged onto the recording medium, whereby a pattern is formed on the recording medium at a high speed. The recording medium is then separated from the conveyor belt by a separation claw, and the recorded product is discharged onto the sheet discharging tray by being supported by a sheet discharging roller and the sheet discharging roll.

This apparatus is provided with a coating mechanism as a mechanism configured to treat a surface of a recording medium with a treatment liquid. This mechanism employs roller coating. A treatment liquid 135 is supplied from a treatment liquid storage tank 140 through an unillustrated path, drawn upward by a drawing roller 137 onto the surface of the roller, and transferred onto a film thickness control roller 138. Then, the treatment liquid transferred onto a coating roller 136 is transferred and applied onto a recording medium 114 inserted between the coating roller and a counter roller 139.

The coating amount of the treatment liquid to be transferred onto the coating roller 136 is adjusted by controlling the thickness of the nip with respect to the coating roller 136. When coating of the treatment liquid is not wanted, a movable blade 134 can be pushed onto the coating roller 136 to scrape off the treatment liquid on the surface of the coating roller so that the treatment liquid may not remain on the coating roller 136. This makes it possible to prevent viscosity build-up due to drying caused by residual treatment liquid on the coating roller 136, adherence with the coating counter roller 139, and functional failures such as coating unevenness. Further, sheet feeding units may be provided one above the other as shown in FIG. 1, so that, for example, the lower sheet feeding unit may be used when applying the treatment liquid, and the upper sheet feeding unit may be used when not applying the treatment liquid.

It is also possible to apply the treatment liquid by spray coating based on a discharging method, other than the roller coating. For example, a head similar to 110K may be filled with the treatment liquid, and the treatment liquid may be discharged onto a recording medium 114 like the ink is done.

The discharging amount and the discharging position can be controlled at high accuracy and easily. It is also possible to use the roller coating method and the spray coating method in combination.

By any of the methods, the treatment liquid can be applied to an arbitrary position in an arbitrary amount.

Further, by heating a recording medium to which the treatment liquid and the ink have been deposited with a hot air blower fan 150, it is possible to promote drying and thereby improve fixability. In this example, the heating step is performed with the hot air fan onto a recording medium after printed. However, it is possible to perform the heating step onto a recording medium before printed, or before and after printed, and the method may be not only the hot air fan, but also a member such as a heating roller.

Figure 3:
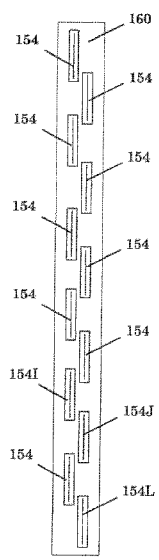
FIG. 3 is an exemplary diagram showing an example of a head arrangement in a head unit of an image forming apparatus.

FIG. 3 is an exemplary diagram showing an example of a head arrangement in the head unit of the image forming apparatus described above.

In the head unit, heads 154A to 154L are fixed on a head outer circumference member 160. The heads are fixed in a staggered arrangement such that nozzles overlap with each other partially.

Figure 4:
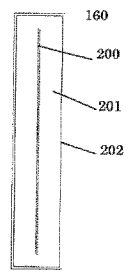
FIG. 4 is an exemplary diagram showing a head arranged in the head unit of FIG. 3.

FIG. 4 is an exemplary diagram showing a head arranged in the head unit of FIG. 3. The heads are provided respectively with nozzles 200, which are opened in a nozzle plate 201 in two lines in a staggered arrangement. The head and the head outer circumference member are sealed with each other with a filling agent 202, to thereby remove clearance from the nozzle surface.

Figure 2:
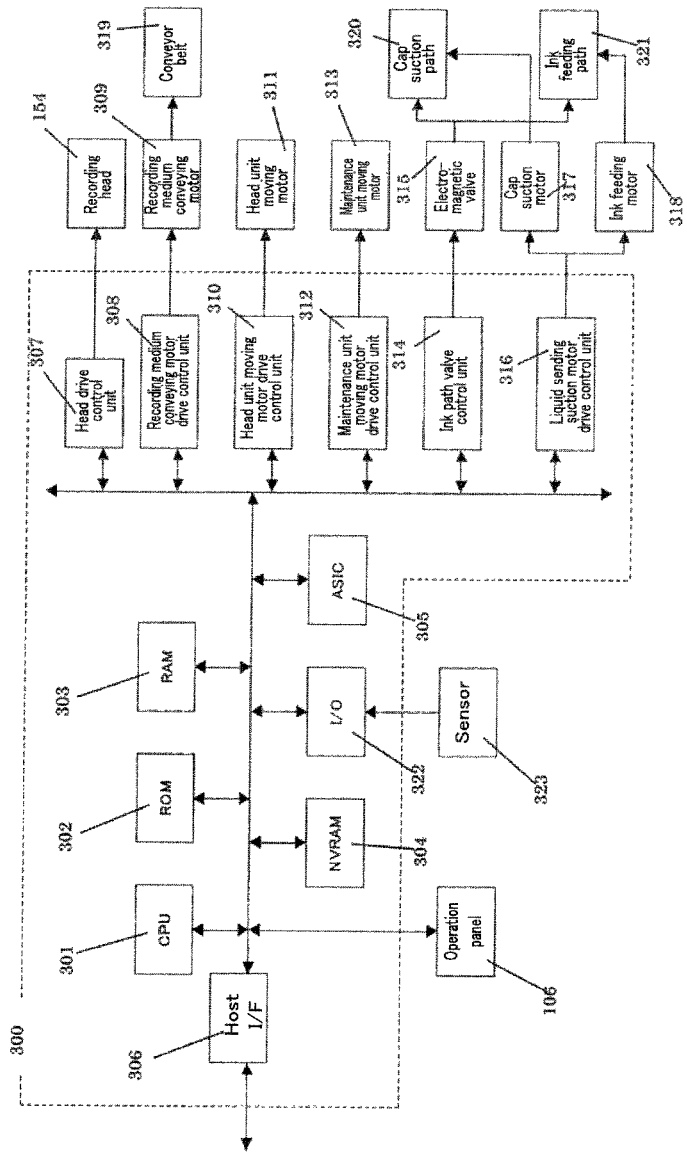
FIG. 2 is a schematic block explanatory diagram of a control unit of FIG. 1.

Next, an outline of a control unit of the image forming apparatus shown in FIG. 1 will be explained with reference to FIG. 2. FIG. 2 is a schematic block explanatory diagram of the control unit.

The control unit 300 includes a CPU 301 configured to control the whole apparatus, a ROM 302 storing a program to be executed by the CPU 301, values of nozzle surface contamination degrees corresponding to predetermined ink discharges and allowable nozzle surface contamination thresholds, drive waveform data, and other fixed data, a RAM 303 configured to store image data, etc. temporarily, a non-volatile memory (NVRAM) 304 configured to retain data even while the power of the apparatus is cut off, and an ASIC 305 configured to perform image processing such as various signal processing and rearrangement to image data and to process input and output signals for controlling the whole apparatus.

The control unit 300 also includes a host I/F 306 through which data and signals are exchanged with a host, a head drive control unit 307 configured to generate a drive waveform for controlling driving of a pressure generation unit of the recording heads 154, a recording medium conveying motor drive control unit 308 configured to drive a recording medium conveying motor 309, a maintenance unit moving motor drive control unit 312 configured to drive a head unit (carriage) moving motor 311, an ink path valve control unit 314 configured to control an electromagnetic valve 315 on the ink path to be opened or closed, a liquid sending suction motor drive control unit 316 configured to control driving of a cap suction motor 317 and an ink feeding motor 318, and an I/O 322 for receiving detection signals from an encoder configured to output a detection signal corresponding to a moving amount and a moving speed of the conveyor belt 113 and from a sensor 323 configured to detect ambient temperature and ambient humidity (or may be either one of these), a detection signal indicating the amount of ink in the sub ink tanks, and detection signals from various sensors unillustrated. An operation panel 106 through which necessary information is input to the apparatus and which is configured to display necessary information is connected to the control unit 300.

The control unit 300 receives print data, etc. at the host I/F 306 through a cable or a net from a host such as an information processing device such as a personal computer, an imaging device such as an image scanner, an image capturing device such as a digital camera, etc.

Then, the CPU 301 reads the print data into a reception buffer included in the host I/F 306 and analyzes the print data, and the ASIC 305 applies necessary image processing and data rearrangement and sends image data (dot pattern data) having the same width as the width of the head 154 and corresponding to 1 page to the head drive control unit 307 in synchronization with a clock signal.

Then, the CPU 301 reads print data into the reception buffer included in the host I/F 306 and analyzes the print data, and the ASIC 305 applies necessary image processing, data rearrangement processing, etc. and sends image data to the head drive control unit 307. Generation of dot pattern data for image output may be executed with font data stored in the ROM 302, or image data may be developed into bitmap data by a printer driver of the host and transferred to this apparatus.

The head drive control unit 307 drives the recording heads 154 by applying a voltage selectively to the pressure generation unit of the recording heads 154 based on the image data (dot pattern data) corresponding to 1 page of the recording heads 154 configured to receive data on a page basis.

Further, because it is necessary to control driving of rollers for coating, such as a coating roller when applying the treatment liquid by roller coating, there are provided a coating motor control unit and a motor to be controlled, and a control sensor, although not illustrated.

Further, when application of the treatment liquid is by discharging, unless a maintenance operation is performed separately from a maintenance operation for the ink, there is a risk of nozzle clogging due to mixing. Therefore, it is desirable to provide a maintenance unit moving motor for the treatment liquid separately from one for the ink.

Next, an ink cartridge will be explained with reference to FIG. 5 and FIG. 6. FIG. 5 is a diagram showing an example of an ink cartridge, and FIG. 6 is a diagram showing the ink cartridge of FIG. 5, including a case (exterior package) thereof.

Figure 5:
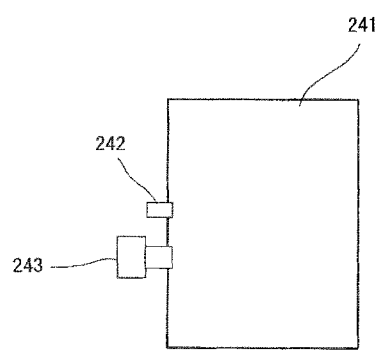
FIG. 5 is a diagram showing an example of an ink cartridge used in an image forming apparatus.
Figure 6:
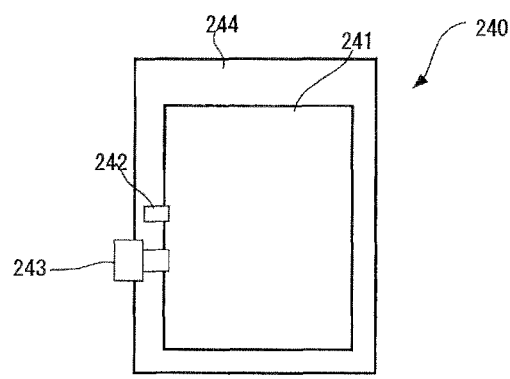
FIG. 6 is a diagram showing the ink cartridge of FIG. 5, including a case (exterior package) thereof.

As shown in FIG. 5, an ink bag 241 is filled with the water-based recording ink through an ink injection port 242, and after the ink bag is evacuated of air, the ink injection port 242 is closed with fusion bonding. For use, an ink discharge port 243 formed of a rubber member is pierced with a needle of the apparatus body for the ink to be supplied to the apparatus.

The ink bag 241 is formed of a packing member made of air-impermeable aluminum laminate film or the like. As shown in FIG. 6, the ink bag 241 is housed in a cartridge case 244 typically made of plastic, and is used as detachably attached on various types of image forming apparatuses as an ink cartridge 240.

Figure 7:
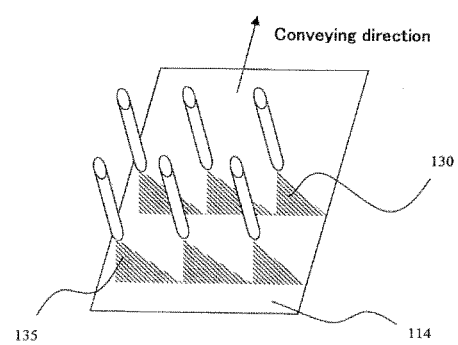
FIG. 7 is an exemplary diagram showing an example of a discharging method of a discharging head of an image forming apparatus.
Figure 8:
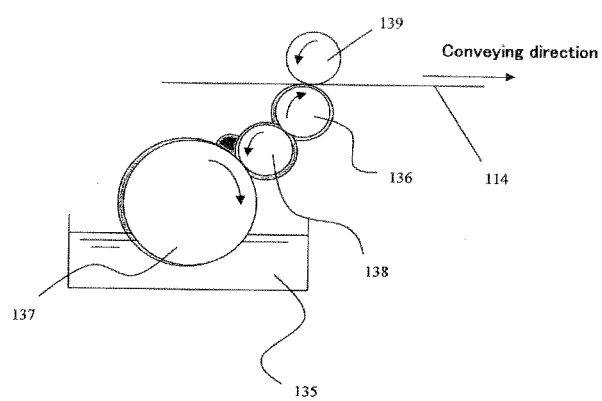
FIG. 8 is an exemplary diagram showing an example of a coating method with 3 rolls.
Figure 9:
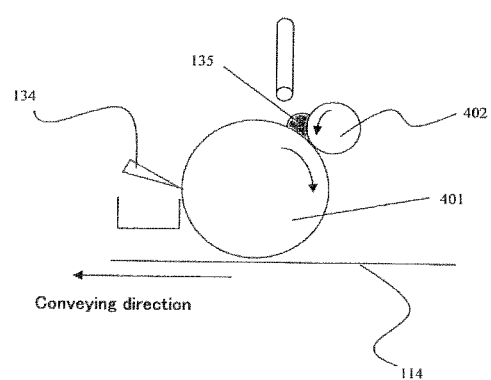
FIG. 9 is an exemplary diagram showing an example of a coating method with 2 rolls.

Further, when the ink cartridge 240 is filled with the treatment liquid instead of an ink and used as a cartridge of the treatment liquid, it can be used as detachably attached on various types of image forming apparatuses, like the ink cartridge The methods shown in FIG. 7 to FIG. 9 are feasible as the method for applying the treatment liquid to a recording medium.

FIG. 7 shows a method of discharging from discharging heads. With a recording head for discharging the treatment liquid 135 provided on the upstream side in the conveying direction of a recording medium 114 and with a recording head for discharging the water-based recording ink 130 provided on the downstream side in the conveying direction, the treatment liquid 135 to be discharged beforehand based on predetermined image data and the water-based recording ink 130 can be mixed on the recording medium 114.

FIG. 8 shows a coating method with 3 rolls, which however is not to be explained here, because it has been described in detail with reference to FIG. 1.

FIG. 9 shows a coating method with 2 rolls, and the treatment liquid 135 discharged from the discharging head is controlled to a predetermined film thickness through a coating roller 401 and a film thickness control roller 401, and a recording medium 114 is coated with this treatment liquid. Any excess treatment liquid remained on the coating roller 401 is collected by the movable blade 134. Although not illustrated here, a discharging head for the water-based recording ink is provided on the upstream side in the conveying direction of FIG. 9.

EXAMPLES

The present invention will be explained below more specifically by presenting Examples and Comparative Examples. The present invention is not limited to these Examples by any means.

<Preparation of Water-Based Recording Ink>

(1) Synthesis Example

Synthesis of Copolymer A

A reaction vessel of an automatic polymerization reaction device (POLYMERIZATION TESTER DSL-2AS manufactured by Todoroki Co.) provided with the reaction vessel, which was equipped with a stirrer, a dropper, a temperature sensor, and a reflux device provided on the top with a nitrogen introducing device, was charged with methyl ethyl ketone (550 g), which was stirred while the reaction vessel was purged with nitrogen. After the reaction vessel was heated to 80° C. while being kept in a nitrogen atmosphere, a mixture solution of methacrylic acid-2-hydroxyethyl (75.0 g), methacrylic acid (77.0 g), styrene (80.0 g), butyl methacrylate (150.0 g), butyl acrylate (98.0 g), methyl methacrylate (20.0 g), and "PERBUTYL (Registered Trademark) O" (manufactured by NOF Corporation) (40.0 g) was dropped into the reaction vessel in 4 hours with the dropper. After the dropping was completed, a reaction was continued for 15 hours at the same temperature, to thereby obtain a methyl ethyl ketone solution of an anionic group-containing styrene/acrylic-based copolymer A having an acid value of 100 mgKOH/g, a weight average molecular weight of 21,000, and Tg of 31° C. (calculated value). After the reaction was terminated, methyl ethyl ketone was partially distilled away at reduced pressure, to thereby obtain a copolymer A solution having a non-volatile content of 50% by mass.

(2) Preparation Example 1

Preparation of Water Pigment Dispersion with Copolymer A

A mixing tank equipped with a cooling jacket was charged with carbon black (RAVEN 1080 manufactured by Colombian Carbon Co., Ltd.) (1,000 g), the copolymer A solution obtained in the synthesis example (800 g), a 100% by mass sodium hydroxide aqueous solution (143 g), methyl ethyl ketone (100 g), and water (1,957 g), and they were stirred and mixed.

The mixture liquid was subjected to a disperser filled with zirconia beads having a diameter of 0.3 mm (SC MILL SC100 manufactured by Nippon Coke & Engineering. Co., Ltd.), and dispersed for 6 hours according to a circulating method (a method of returning a dispersion liquid discharged from the disperser to the mixing tank). The rotation speed of the disperser was 2,700 rpm, and cool water was passed through the cooling jacket to keep the temperature of the dispersion liquid at 40° C. or lower. After the dispersion was terminated, the dispersion liquid was drawn out from the mixing tank, and the mixing tank and the flow path of the disperser were washed with water (10,000 g), with which the dispersion liquid was mixed, to thereby obtain a diluted dispersion liquid. The diluted dispersion liquid was poured into a distillation device made of glass, to distill away the whole amount of methyl ethyl ketone, and some of the water. After the resultant was cooled to room temperature, 10% hydrochloric acid was dropped to the resultant while it was stirred, to be thereby adjusted to pH of 4.5. From which, the solid content was filtered out with a Nutsche type filtration device, and was washed with water. The obtained cake was put in a vessel, a 20% by mass potassium hydroxide aqueous solution (200 g) was added thereto, after this they were dispersed with a diaper (TK HOMODISPER manufactured by Primix Corporation), and water was further added thereto to adjust the non-volatile content, to thereby obtain a water pigment dispersion (carbon black), in which carbon black having a non-volatile content of 20% by mass was dispersed in an aqueous medium as composite particles (microcapsules) coated with a carboxyl group-containing styrene/acrylic-based copolymer neutralized in potassium hydroxide.

Furthermore, a water pigment dispersion (cyan) was obtained in the same manner as described above, except that carbon black was changed to copper phthalocyanine (SEIKALIGHT BLUE A612 manufactured by Dainichiseika Color & Chemicals Mfg. Co., Ltd.).

(3) Preparation Example 2

Preparation of Water-Based Recording Ink with Water Pigment Dispersion

A water-soluble organic solvent, a surfactant, a penetrant, a pH adjuster, an antiseptic and mildewcide, and water shown in the respective fields of Examples and Comparative Examples of Tables 1 to 4 below were stirred for 1 hour to be mixed uniformly. Next, a foam suppressor was added thereto, and they were stirred for another 1 hour to be mixed uniformly. After this, the water pigment dispersion obtained in Preparation Example 1 was added thereto, and they were stirred for another 1 hour to be mixed uniformly. The resulting mixture was filtered under pressure through a polyvinylidene fluoride membrane filter having an average pore diameter of 0.8 m to remove coarse particles and dust, to thereby obtain a water-based recording ink. The colorant was contained in the water-based recording ink at a ratio at which the solid content of the water pigment dispersion obtained in Preparation Example 1 would be contained in an amount of 8% by mass. The contents of the respective components of the water-based recording inks in Tables 1 to 4 are in % by mass.
<Preparation of Treatment Liquid>

An organic acid, an organic acid neutralizer, a cationic resin, a water-soluble organic solvent, a surfactant, a foam suppressor, an antiseptic and mildewcide, and water shown in the respective fields of Examples and Comparative Examples of Tables 1 to 4 below were stirred for 1 hour to be mixed uniformly. The resulting mixture was filtered under pressure through a polyvinylidene fluoride membrane filter having an average pore diameter of 0.8 μm to remove coarse particles and dust, to thereby obtain a treatment liquid. The contents of the respective components of the treatment liquids in Tables 1 to 4 are in % by mass. The details of the respective materials in Tables 1 to 4 were as follows.

Styrene/acrylic-based resin: X-436 manufactured by Seiko PMC Corporation

Rosin-modified maleic acid resin: R-100 manufactured by Harima Chemicals Group, Inc.

Lactic acid and DL-malic acid: manufactured by Kanto Kagaku

Neutralizer of Structural Formula 2: triethanol amine manufactured by Kanto Kagaku Neutralizer of Structural Formula 3: hydroxyethyl piperazine manufactured by Nippon Nyukazai Co., Ltd.

Neutralizer of Structural Formula 4: N—(β-aminoethyl) ethanol amine

Neutralizer of Structural Formula 6: N-methyldiethanol amine manufactured by Nippon Nyukazai Co., Ltd.

Neutralizer of Structural Formula 6: N-n-butyldiethanol amine manufactured by Nippon Nyukazai Co., Ltd.

Neutralizer of Structural Formula 7: tetrapropyl ammonium hydroxide manufactured by Kanto Kagaku Cationic resin of General Formula 8: CATIOMASTER PDT-2 manufactured by Yokkaichi Chemical Company, Limited Cationic resin of General Formula 9: UNISENSE KHE-104L manufactured by Senka Corporation Cationic resin of General Formula 10: UNISENSE KHE-100L manufactured by Senka Corporation Sodium poly-γ-glutamate: AMINOGEL manufactured by Merica Co., Ltd.

N-acyl fatty acid-sodium L-glutamate: AMISOFT CS-22 manufactured by Ajinomoto Healthy Supply, Inc.

Sodium N-lauroyl-L-aspartate: manufactured by Daito Kasei Kogyo Co., Ltd.

Water-soluble organic solvent of General Formula 1: SURFMELLOW manufactured by Toyobo Co., Ltd.

Fluorosurfactant: ZONYL FS300 manufactured by Du Pont Kabushiki Kaisha

Silicone-based foam suppressor: KM72F manufactured by Shin-Etsu Silicones Co., Ltd.
<Printing Method>

With a wire bar (with a winding diameter of 0.05 mm) manufactured by Kobayashi Engineering Works, Ltd., the treatment liquid of each of Examples and Comparative Examples was applied uniformly to a recording medium (OK TOPCOAT+ manufactured by Oji Paper Co., Ltd.) in an application amount of 2 g/m². After this, the resultant was dried according to necessity in a drying step (at 90° C. for 30 seconds). Then, with an image forming apparatus (IPSIO GXE5500 manufactured by Ricoh Company Limited), a water-based recording ink was discharged onto the recording medium, to thereby obtain a print sample. A 3 cm square solid image formed of a dot pattern was used as a print chart.

Characteristics of each print sample and treatment liquid were evaluated according to the following method. The results are collectively shown in Tables 1 to 4.
<Image Density>

A solid portion of the 3 cm square solid image formed of a dot pattern was measured with a spectrodensitometer (939) manufactured by X-Rite Inc.

<Beading Rank>

The solid portion of the 3 cm square solid image formed of a dot pattern was visually evaluated and ranked for beading based on the following criteria.

[Evaluation Criteria]
5: No beading was observed
4: Very slight beading was observed, but not problematic (the beading was such a level as could not be noticed unless fixated).
3: Slight beading was observed, but not problematic.
2: Beading was observed, and could be visually noticed undoubtedly (problematic level)
1: Severe beading was observed (the same level as when no treatment liquid was applied).

<Foaming Property Evaluation: Foam Height 30 Seconds After>

Each treatment liquid (10 mL) was put in a graduated cylinder having a cubic capacity of 100 mL and left as is for one daytime and nighttime. After this, the graduated cylinder was put in a constant temperature water tank of 10° C. for 30 minutes or longer to condition the liquid temperature. When the liquid temperature was conditioned sufficiently, air was blown thereinto with a predetermined syringe to cause foaming of the liquid, and 30 seconds after, the foam height was visually measured. Where the foam height 30 seconds after is 50 mL or lower, the foaming property is favorable.

<Curling Evaluation>

A solid image of 10 cm×15 cm was printed on the leading end portion of an image, and an amount of curling was measured 10 seconds after the printing. An amount of 25 mm or less is favorable, an amount of 50 mm or less is at least not problematic, and an amount of greater than 50 mm is problematic.

<Viscosity Change Ratio under Open Air:Storage Stability Evaluation>

Each treatment liquid was left in a thermostatic bath having a temperature of 23° C. and a humidity of 20% with the bath opened, and the total amount and viscosity before and after the leaving were measured. From these values, the viscosity change ratio when 10% of the moisture had evaporated was calculated.

A viscosity change ratio of 100% or lower is favorable.

<Corrosion Level of Metallic Member>

A metallic member (SUS303) was immersed in each treatment liquid (30 mL), and left in a thermostatic bath of 50° C. for 3 weeks. After this, the corrosion level of the metallic member was visually evaluated based on the following criteria.

[Evaluation Criteria]
A: No corrosion was observed.
B: Slight corrosion was observed, but not problematic.
C: Corrosion was observed.

TABLE 1

| | | | Examples | | | | | |
| --- | --- | --- | --- | --- | --- | --- | --- | --- |
| | | | 1 | 2 | 3 | 4 | 5 | 6 |
| Water-based recording ink | Colorant | Carbon black dispersion | 8.0 | 8.0 | 8.0 | 8.0 | 8.0 | 8.0 |
| | | Copper phthalocyanine dispersion | | | | | | |
| | Carboxyl group-containing resin | Styrene/acrylic-based resin | 2.0 | 2.0 | 2.0 | 2.0 | | 2.0 |
| | | Rosin-modified maleic acid resin | | | | | 2.0 | |
| | Water-soluble organic solvent | Glycerin | 23.0 | 23.0 | 23.0 | 23.0 | 23.0 | 23.0 |
| | | 1,3-butanediol | 11.0 | 11.0 | 11.0 | 11.0 | 11.0 | 11.0 |
| | Surfactant | Surfactant of Structural Formula 16 | 0.4 | 0.4 | 0.4 | 0.4 | 0.4 | 0.4 |
| | Foam suppressor | N-octyl-2-pyrrolidone | 1.2 | 1.2 | 1.2 | 1.2 | 1.2 | 1.2 |
| | Penetrant | 1,2-octanediol | 2.0 | 2.0 | 2.0 | 2.0 | 2.0 | 2.0 |
| | PH adjuster | 2-amino-2-ethyl-1,3-Propanediol | 0.5 | 0.5 | 0.5 | 0.5 | 0.5 | 0.5 |
| | Antiseptic mildewcide | LV (S) by Avecia Inc. | 0.1 | 0.1 | 0.1 | 0.1 | 0.1 | 0.1 |
| | Water | Ion-exchanged water | 51.8 | 51.8 | 51.8 | 51.8 | 51.8 | 51.8 |
| | | Total | 100.0 | 100.0 | 100.0 | 100.0 | 100.0 | 100.0 |
| Treatment liquid | Organic acid | Lactic acid | | | | | | |
| | | DL-malic acid | | | | | | |
| | Organic acid neutralizer | Compound of Structural Formula 2 | | | | | | |
| | | Compound of Structural Formula 3 | | | | | | |
| | | Compound of Structural Formula 4 | | | | | | |
| | | Compound of Structural Formula 5 | | | | | | |
| | | Compound of Structural Formula 6 | | | | | | |
| | | Compound of Structural Formula 7 | | | | | | |
| | Cationic resin | Compound of General Formula 8 | 35.0 | 35.0 | 35.0 | 35.0 | 35.0 | 35.0 |
| | | Compound of General Formula 9 | | | | | | |
| | | Compound of General Formula 10 | | | | | | |

TABLE 1-continued

|  |  |  |  |  |  |  |  |  |
|---|---|---|---|---|---|---|---|---|
|  | Water-soluble organic solvent | Sodium poly-γ-glutamate | 20.0 |  |  |  | 20.0 | 1.0 |
|  |  | N-acyl fatty acid-sodium L-glutamate |  | 20.0 |  |  |  |  |
|  |  | Sodium N-lauroyl-L-aspartate |  |  | 20.0 |  |  |  |
|  |  | Compound of General Formula 1 |  |  |  | 20.0 |  |  |
|  | Surfactant | Fluorosurfactant Surfactant of Structural Formula 13 | 0.3 | 0.3 | 0.3 | 0.3 | 0.3 | 0.3 |
|  |  | Polyoxyalkylene alkyl ether |  |  |  |  |  |  |
|  | Foam suppressor | N-octyl-2-pyrrolidone | 1.0 | 1.0 | 1.0 | 1.0 | 1.0 | 1.0 |
|  |  | 2,4,7,9-tetramethyl decane-4,7-diol |  |  |  |  |  |  |
|  |  | 2,5,8,11-tetramethyl dodecane-5,8-diol |  |  |  |  |  |  |
|  |  | Silicone-based foam suppressor |  |  |  |  |  |  |
|  | Antiseptic mildewcide | LV (S) by Avecia Inc. | 0.1 | 0.1 | 0.1 | 0.1 | 0.1 | 0.1 |
|  | Water | Ion-exchanged water | 43.6 | 43.6 | 43.6 | 43.6 | 43.6 | 62.6 |
|  |  | Total | 100.0 | 100.0 | 100.0 | 100.0 | 100.0 | 100.0 |
|  | Presence/absence of drying step (90° C. for 30 sec.) |  | present | present | present | present | present | present |
| Evaluation item | Image density |  | 1.30 | 1.34 | 1.27 | 1.25 | 1.28 | 1.26 |
|  | Beading rank |  | 5 | 5 | 5 | 5 | 5 | 5 |
|  | Amount of curling [mm] |  | 18 | 15 | 11 | 8 | 20 | 48 |
|  | Foaming property evaluation (30 sec. after foam height) [mL] |  | 0 | 0 | 0 | 0 | 0 | 0 |
|  | Viscosity change ratio under open air [%] |  | 62 | 78 | 89 | 95 | 58 | 185 |
|  | Corrosion level of metallic member |  | A | A | A | A | A | B |

|  |  |  | Examples |  |  |  |  |  |
|---|---|---|---|---|---|---|---|---|
|  |  |  | 7 | 8 | 9 | 10 | 11 | 12 |
| Water-based recording ink | Colorant | Carbon black dispersion | 8.0 | 8.0 | 8.0 | 8.0 | 8.0 | 8.0 |
|  |  | Copper phthalocyanine dispersion |  |  |  |  |  |  |
|  | Carboxyl group-containing resin | Styrene/acrylic-based resin | 2.0 | 2.0 | 2.0 | 2.0 | 2.0 | 2.0 |
|  |  | Rosin-modified maleic acid resin |  |  |  |  |  |  |
|  | Water-soluble organic solvent | Glycerin | 23.0 | 23.0 | 23.0 | 23.0 | 23.0 | 23.0 |
|  |  | 1,3-butanediol | 11.0 | 11.0 | 11.0 | 11.0 | 11.0 | 11.0 |
|  | Surfactant | Surfactant of Structural Formula 16 | 0.4 | 0.4 | 0.4 | 0.4 | 0.4 | 0.4 |
|  | Foam suppressor | N-octyl-2-pyrrolidone | 1.2 | 1.2 | 1.2 | 1.2 | 1.2 | 1.2 |
|  | Penetrant | 1,2-octanediol | 2.0 | 2.0 | 2.0 | 2.0 | 2.0 | 2.0 |
|  | PH adjuster | 2-amino-2-ethyl-1,3-Propanediol | 0.5 | 0.5 | 0.5 | 0.5 | 0.5 | 0.5 |
|  | Antiseptic mildewcide | LV (S) by Avecia Inc. | 0.1 | 0.1 | 0.1 | 0.1 | 0.1 | 0.1 |
|  | Water | Ion-exchanged water | 51.8 | 51.8 | 51.8 | 51.8 | 51.8 | 51.8 |
|  |  | Total | 100.0 | 100.0 | 100.0 | 100.0 | 100.0 | 100.0 |
| Treatment liquid | Organic acid | Lactic acid |  |  |  | 20.0 | 20.0 | 20.0 |
|  |  | DL-malic acid |  |  |  |  |  |  |
|  | Organic acid neutralizer | Compound of Structural Formula 2 |  |  | 10.0 |  |  |  |
|  |  | Compound of Structural Formula 3 |  |  |  |  | 10.0 |  |
|  |  | Compound of Structural Formula 4 |  |  |  |  |  | 10.0 |
|  |  | Compound of Structural Formula 5 |  |  |  |  |  |  |
|  |  | Compound of Structural Formula 6 |  |  |  |  |  |  |

TABLE 1-continued

| | | | | | | | |
|---|---|---|---|---|---|---|---|
| Cationic resin | Compound of Structural Formula 7 | | | | | | |
| | Compound of General Formula 8 | 35.0 | 35.0 | 35.0 | | | |
| | Compound of General Formula 9 | | | | | | |
| | Compound of General Formula 10 | | | | | | |
| Water-soluble organic solvent | Sodium poly-γ-glutamate | 5.0 | 30.0 | 40.0 | 20.0 | 20.0 | 20.0 |
| | N-acyl fatty acid-sodium L-glutamate | | | | | | |
| | Sodium N-lauroyl-L-aspartate | | | | | | |
| | Compound of General Formula 1 | | | | | | |
| Surfactant | Fluorosurfactant | | | | | | |
| | Surfactant of Structural Formula 13 | 0.3 | 0.3 | 0.3 | 0.3 | 0.3 | 0.3 |
| | Polyoxyalkylene alkyl ether | | | | | | |
| Foam suppressor | N-octyl-2-pyrrolidone | 1.0 | 1.0 | 1.0 | 1.0 | 1.0 | 1.0 |
| | 2,4,7,9-tetramethyl decane-4,7-diol | | | | | | |
| | 2,5,8,11-tetramethyl dodecane-5,8-diol | | | | | | |
| | Silicone-based foam suppressor | | | | | | |
| Antiseptic mildewcide | LV (S) by Avecia Inc. | 0.1 | 0.1 | 0.1 | 0.1 | 0.1 | 0.1 |
| Water | Ion-exchanged water | 58.6 | 33.6 | 23.6 | 48.6 | 48.6 | 48.6 |
| | Total | 100.0 | 100.0 | 100.0 | 100.0 | 100.0 | 100.0 |
| | Presence/absence of drying step (90° C. for 30 sec.) | present | present | present | present | present | present |
| Evaluation item | Image density | 1.28 | 1.32 | 1.35 | 1.21 | 1.23 | 1.25 |
| | Beading rank | 5 | 5 | 5 | 5 | 5 | 5 |
| | Amount of curling [mm] | 30 | 7 | 5 | 19 | 25 | 22 |
| | Foaming property evaluation (30 sec. after foam height) [mL] | 0 | 15 | 50 | 0 | 0 | 0 |
| | Viscosity change ratio under open air [%] | 105 | 75 | 87 | 45 | 58 | 54 |
| | Corrosion level of metallic member | A | A | A | A | A | A |

TABLE 2

|  |  |  | Examples | | | | | | | | | | | |
|---|---|---|---|---|---|---|---|---|---|---|---|---|---|---|
|  |  |  | 13 | 14 | 15 | 16 | 17 | 18 | 19 | 20 | 21 | 22 | 23 | 24 |
| Water-based recording ink | Colorant | Carbon black dispersion | 8.0 | 8.0 | 8.0 | 8.0 | 8.0 | 8.0 | 8.0 | 8.0 | 8.0 | 8.0 | 8.0 | 8.0 |
|  |  | Copper phthalocyanine dispersion | 2.0 | 2.0 | 2.0 | 2.0 | 2.0 | 2.0 | 2.0 | 2.0 | 2.0 | 2.0 | 2.0 | 2.0 |
|  | Carboxyl group-containing resin | Styrene/acrylic-based resin | 23.0 | 23.0 | 23.0 | 23.0 | 23.0 | 23.0 | 23.0 | 23.0 | 23.0 | 23.0 | 23.0 | 23.0 |
|  |  | Rosin-modified maleic acid resin | 11.0 | 11.0 | 11.0 | 11.0 | 11.0 | 11.0 | 11.0 | 11.0 | 11.0 | 11.0 | 11.0 | 11.0 |
|  | Water-soluble organic solvent | Glycerin | 0.4 | 0.4 | 0.4 | 0.4 | 0.4 | 0.4 | 0.4 | 0.4 | 0.4 | 0.4 | 0.4 | 0.4 |
|  |  | 1,3-butanediol | 1.2 | 1.2 | 1.2 | 1.2 | 1.2 | 1.2 | 1.2 | 1.2 | 1.2 | 1.2 | 1.2 | 1.2 |
|  | Surfactant | Surfactant of Structural Formula 16 | 2.0 | 2.0 | 2.0 | 2.0 | 2.0 | 2.0 | 2.0 | 2.0 | 2.0 | 2.0 | 2.0 | 2.0 |
|  | Foam suppressor | N-octyl-2-pyrrolidone | 0.5 | 0.5 | 0.5 | 0.5 | 0.5 | 0.5 | 0.5 | 0.5 | 0.5 | 0.5 | 0.5 | 0.5 |
|  | Penetrant | 2-amino-2-ethyl-1,3-propanediol | 0.5 | 0.5 | 0.5 | 0.5 | 0.5 | 0.5 | 0.5 | 0.5 | 0.5 | 0.5 | 0.5 | 0.5 |
|  | PH adjuster | 1,2-octanediol | 2.0 | 2.0 | 2.0 | 2.0 | 2.0 | 2.0 | 2.0 | 2.0 | 2.0 | 2.0 | 2.0 | 2.0 |
|  | Antiseptic mildewcide | LV (S) by Avecia Inc. | 0.1 | 0.1 | 0.1 | 0.1 | 0.1 | 0.1 | 0.1 | 0.1 | 0.1 | 0.1 | 0.1 | 0.1 |
|  | Water | Ion-exchanged water | 51.8 | 51.8 | 51.8 | 51.8 | 51.8 | 51.8 | 51.8 | 51.8 | 51.8 | 51.8 | 51.8 | 51.8 |
|  |  | Total | 100.0 | 100.0 | 100.0 | 100.0 | 100.0 | 100.0 | 100.0 | 100.0 | 100.0 | 100.0 | 100.0 | 100.0 |
| Treatment liquid | Organic acid | Lactic acid | 1.0 | 30.0 | 40.0 |  |  |  |  |  |  |  |  |  |
|  |  | DL-malic acid |  |  |  | 10.0 |  |  |  |  |  |  |  |  |
|  |  | Compound of Structural Formula 2 |  |  |  |  | 10.0 | 30.0 |  |  |  |  |  |  |
|  | Organic acid neutralizer | Compound of Structural Formula 3 | 0.5 | 15.0 | 20.0 | 10.0 |  |  |  |  |  |  |  |  |
|  |  | Compound of Structural Formula 4 |  |  |  |  |  |  | 37.5 |  |  |  |  |  |
|  |  | Compound of Structural Formula 5 |  |  |  |  |  |  |  | 1.0 | 10.0 | 40.0 | 50.0 | 55.0 |
|  |  | Compound of Structural Formula 6 |  |  |  |  |  |  |  |  |  |  |  |  |
|  |  | Compound of Structural Formula 7 |  |  |  |  |  |  |  |  |  |  |  |  |
|  | Cationic resin | Compound of General Formula 8 |  |  |  |  |  |  |  |  |  |  |  |  |
|  |  | Compound of General Formula 9 |  |  |  |  |  |  |  |  |  |  |  |  |
|  |  | Compound of General Formula 10 |  |  |  |  |  |  |  |  |  |  |  |  |
|  | Water-soluble organic solvent | Sodium poly-γ-glutamate | 20.0 | 20.0 | 20.0 | 20.0 | 20.0 | 20.0 | 20.0 | 20.0 | 20.0 | 20.0 | 20.0 | 20.0 |
|  |  | N-acyl fatty acid-sodium L-glutamate |  |  |  |  |  |  |  |  |  |  |  |  |
|  |  | Sodium N-lauroyl-L-aspartate |  |  |  |  |  |  |  |  |  |  |  |  |
|  |  | Compound of General Formula 1 |  |  |  |  |  |  |  |  |  |  |  |  |
|  | Surfactant | Fluorosurfactant | 0.3 | 0.3 | 0.3 | 0.3 | 0.3 | 0.3 | 0.3 | 0.3 | 0.3 | 0.3 | 0.3 | 0.3 |
|  |  | Surfactant of Structural Formula 13 |  |  |  |  |  |  |  |  |  |  |  |  |
|  |  | Polyoxyalkylene alkyl ether |  |  |  |  |  |  |  |  |  |  |  |  |
|  | Foam suppressor | N-octyl-2-pyrrolidone | 1.0 | 1.0 | 1.0 | 1.0 | 1.0 | 1.0 | 1.0 | 1.0 | 1.0 | 1.0 | 1.0 | 1.0 |
|  |  | 2,4,7,9-tetramethyl decane-4,7-diol |  |  |  |  |  |  |  |  |  |  |  |  |
|  |  | 2,5,8,11-tetramethyl dodecane-5,8-diol |  |  |  |  |  |  |  |  |  |  |  |  |
|  |  | Silicone-based foam suppressor |  |  |  |  |  |  |  |  |  |  |  |  |
|  | Antiseptic mildewcide | LV (S) by Avecia Inc. | 0.1 | 0.1 | 0.1 | 0.1 | 0.1 | 0.1 | 0.1 | 0.1 | 0.1 | 0.1 | 0.1 | 0.1 |
|  | Water | Ion-exchanged water | 77.1 | 33.6 | 18.6 | 58.6 | 48.6 | 28.6 | 21.1 | 77.6 | 68.6 | 38.6 | 28.6 | 23.6 |
|  |  | Total | 100.0 | 100.0 | 100.0 | 100.0 | 100.0 | 100.0 | 100.0 | 100.0 | 100.0 | 100.0 | 100.0 | 100.0 |

TABLE 2-continued

| | | Examples | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Evaluation item | Presence/absence of drying step (90° C. for 30 sec.) | present | present | present | present | present | present | present | present | present | present | present | present |
| | Image density | 1.08 | 1.22 | 1.22 | 1.21 | 1.20 | 1.28 | 1.19 | 1.11 | 1.16 | 1.30 | 1.25 | 1.24 |
| | Beading rank | 3 | 5 | 5 | 5 | 5 | 5 | 5 | 3 | 5 | 5 | 5 | 5 |
| | Amount of curling [mm] | 48 | 15 | 10 | 24 | 18 | 18 | 18 | 48 | 38 | 14 | 15 | 11 |
| | Foaming property evaluation (30 sec. after foam height) [mL] | 0 | 0 | 0 | 0 | 0 | 0 | 0 | 0 | 0 | 0 | 0 | 0 |
| | Viscosity change ratio under open air [%] | 41 | 73 | 105 | 45 | 50 | 83 | 95 | 49 | 55 | 88 | 98 | 155 |
| | Corrosion level of metallic member | A | B | B | A | A | A | A | A | A | A | B | B |

TABLE 3

| | | | Examples | | | | | | | | | | | |
|---|---|---|---|---|---|---|---|---|---|---|---|---|---|---|
| | | | 25 | 26 | 27 | 28 | 29 | 30 | 31 | 32 | 33 | 34 | 35 |
| Water-based recording ink | Colorant | Carbon black dispersion | 8.0 | 8.0 | 8.0 | 8.0 | 8.0 | 8.0 | 8.0 | 8.0 | 8.0 | | 8.0 |
| | | Copper phthalocyanine dispersion | | | | | | | | | | 8.0 | |
| | Carboxyl group-containing resin | Styrene/acrylic-based resin | 2.0 | 2.0 | 2.0 | 2.0 | 2.0 | 2.0 | 2.0 | 2.0 | 2.0 | 2.0 | 2.0 |
| | | Rosin-modified maleic acid resin | | | | | | | | | | | |
| | Water-soluble organic solvent | Glycerin | 23.0 | 23.0 | 23.0 | 23.0 | 23.0 | 23.0 | 23.0 | 23.0 | 23.0 | 23.0 | 23.0 |
| | | 1,3-butanediol | 11.0 | 11.0 | 11.0 | 11.0 | 11.0 | 11.0 | 11.0 | 11.0 | 11.0 | 11.0 | 11.0 |
| | Surfactant | Surfactant of Structural Formula 16 | 0.4 | 0.4 | 0.4 | 0.4 | 0.4 | 0.4 | 0.4 | 0.4 | 0.4 | 0.4 | 0.4 |
| | Foam suppressor | N-octyl-2-pyrrolidone | 1.2 | 1.2 | 1.2 | 1.2 | 1.2 | 1.2 | 1.2 | 1.2 | 1.2 | 1.2 | 1.2 |
| | Penetrant | 1,2-octanediol | 2.0 | 2.0 | 2.0 | 2.0 | 2.0 | 2.0 | 2.0 | 2.0 | 2.0 | 2.0 | 2.0 |
| | pH adjuster | 2-amino-2-ethyl-1,3-propanediol | 0.5 | 0.5 | 0.5 | 0.5 | 0.5 | 0.5 | 0.5 | 0.5 | 0.5 | 0.5 | 0.5 |
| | Antiseptic mildewcide | LV (S) by Avecia Inc. | 0.1 | 0.1 | 0.1 | 0.1 | 0.1 | 0.1 | 0.1 | 0.1 | 0.1 | 0.1 | 0.1 |
| | Water | Ion-exchanged water | 51.8 | 51.8 | 51.8 | 51.8 | 51.8 | 51.8 | 51.8 | 51.8 | 51.8 | 51.8 | 51.8 |
| | | Total | 100.0 | 100.0 | 100.0 | 100.0 | 100.0 | 100.0 | 100.0 | 100.0 | 100.0 | 100.0 | 100.0 |
| Treatment liquid | Organic acid | Lactic acid | | | | | | | | | | | |
| | | DL-malic acid | | | | | | | | | | | |
| | Organic acid neutralizer | Compound of Structural Formula 2 | | | | | | | | | | | |
| | | Compound of Structural Formula 3 | | | | | | | | | | | |
| | | Compound of Structural Formula 4 | | | | | | | | | | | |
| | | Compound of Structural Formula 5 | | | | | | | | | | | |
| | | Compound of Structural Formula 6 | | | | | | | | | | | |
| | | Compound of Structural Formula 7 | | | | | | | | | | | |
| | Cationic resin | Compound of General Formula 8 | | | 35.0 | 35.0 | 35.0 | 35.0 | 35.0 | 35.0 | 35.0 | 35.0 | 35.0 |
| | | Compound of General Formula 9 | 35.0 | | | | | | | | | | |
| | | Compound of General Formula 10 | | 35.0 | | | | | | | | | |
| | Water-soluble organic solvent | Sodium poly-γ-glutamate | 20.0 | 20.0 | 20.0 | 20.0 | 20.0 | 20.0 | 20.0 | 20.0 | 20.0 | 20.0 | 20.0 |
| | | N-acyl fatty acid-sodium L-glutamate | | | | | | | | | | | |
| | | Sodium N-lauroyl-L-aspartate | | | | | | | | | | | |
| | | Compound of General Formula 1 | | | | | | | | | | | |
| | Surfactant | Fluorosurfactant | | | | 0.3 | | | | | | | |
| | | Surfactant of Structural Formula 13 | 0.3 | 0.3 | | | 0.3 | 0.3 | 0.3 | | 0.3 | 0.3 | 0.3 |
| | | Polyoxyalkylene alkyl ether | | | 1.0 | | | | | | | | |
| | Foam suppressor | N-octyl-2-pyrrolidone | 1.0 | 1.0 | 3.0 | 1.0 | | | | | 1.0 | 1.0 | 1.0 |
| | | 2,4,7,9-tetramethyl decane-4,7-diol | | | | | 1.0 | | | | | | |
| | | 2,5,8,11-tetramethyl dodecane-5,8-diol | | | | | | 1.0 | | | | | |
| | | Silicone-based foam suppressor | | | | | | | 1.0 | | | | |
| | Antiseptic mildewcide | LV (S) by Avecia Inc. | 0.1 | 0.1 | 0.1 | 0.1 | 0.1 | 0.1 | 0.1 | 0.1 | 0.1 | 0.1 | 0.1 |
| | Water | Ion-exchanged water | 43.6 | 43.6 | 40.9 | 43.6 | 43.6 | 43.6 | 43.6 | 43.9 | 44.6 | 43.6 | 43.6 |
| | | Total | 100.0 | 100.0 | 100.0 | 100.0 | 100.0 | 100.0 | 100.0 | 100.0 | 100.0 | 100.0 | 100.0 |

TABLE 3-continued

|  |  | Examples | | | | | | | | | | |
| --- | --- | --- | --- | --- | --- | --- | --- | --- | --- | --- | --- | --- |
|  |  | 25 | 26 | 27 | 28 | 29 | 30 | 31 | 32 | 33 | 34 | 35 |
|  | Presence/absence of drying step (90° C. for 30 sec.) | present | present | present | present | present | present | present | present | present | present | absent |
| Evaluation item | Image density | 1.30 | 1.33 | 1.32 | 1.30 | 1.32 | 1.31 | 1.30 | 1.31 | 1.28 | 1.22 | 1.25 |
|  | Beading rank | 5 | 5 | 5 | 5 | 5 | 5 | 5 | 5 | 5 | 5 | 4 |
|  | Amount of curling [mm] | 10 | 18 | 12 | 18 | 16 | 16 | 15 | 18 | 18 | 20 | 29 |
|  | Foaming property evaluation (30 sec. after foam height) [mL] | 0 | 0 | 0 | 50 | 0 | 0 | 75 | 0 | 90 | 0 | 0 |
|  | Viscosity change ratio under open air [%] | 63 | 74 | 66 | 65 | 60 | 55 | 70 | 58 | 62 | 59 | 62 |
|  | Corrosion level of metallic member | A | A | A | A | A | A | A | A | A | A | A |

TABLE 4

|  |  |  | Comparative Examples | | | | | |
| --- | --- | --- | --- | --- | --- | --- | --- | --- |
|  |  |  | 1 | 2 | 3 | 4 | 5 | 6 |
| Water-based recording ink | Colorant | Carbon black dispersion | 8.0 | 8.0 | 8.0 |  | 8.0 | 8.0 |
|  |  | Copper phthalocyanine dispersion |  |  |  | 8.0 |  |  |
|  | Carboxyl group-containing resin | Styrene/acrylic-based resin | 2.0 | 2.0 | 2.0 | 2.0 |  |  |
|  |  | Rosin-modified maleic acid resin |  |  |  |  |  |  |
|  | Water-soluble organic solvent | Glycerin | 23.0 | 23.0 | 23.0 | 23.0 | 23.0 | 23.0 |
|  |  | 1,3-butanediol | 11.0 | 11.0 | 11.0 | 11.0 | 11.0 | 11.0 |
|  | Surfactant | Surfactant of Structural Formula 16 | 0.4 | 0.4 | 0.4 | 0.4 | 0.4 | 0.4 |
|  | Foam suppressor | N-octyl-2-pyrrolidone | 1.2 | 1.2 | 1.2 | 1.2 | 1.2 | 1.2 |
|  | Penetrant | 1,2-octanediol | 2.0 | 2.0 | 2.0 | 2.0 | 2.0 | 2.0 |
|  | pH adjuster | 2-amino-2-ethyl-1,3-propanediol | 0.5 | 0.5 | 0.5 | 0.5 | 0.5 | 0.5 |
|  | Antiseptic mildewcide | LV (S) by Avecia Inc. | 0.1 | 0.1 | 0.1 | 0.1 | 0.1 | 0.1 |
|  | Water | Ion-exchanged water | 51.8 | 51.8 | 51.8 | 51.8 | 53.8 | 53.8 |
|  |  | Total | 100.0 | 100.0 | 100.0 | 100.0 | 100.0 | 100.0 |
| Treatment liquid | Organic acid | Lactic acid |  |  |  | 20.0 |  | 20.0 |
|  |  | DL-malic acid |  |  |  |  |  |  |
|  | Organic acid neutralizer | Compound of Structural Formula 2 |  |  |  |  | 100 |  |
|  |  | Compound of Structural Formula 3 |  |  |  |  |  |  |
|  |  | Compound of Structural Formula 4 |  |  | 10.0 |  |  |  |
|  |  | Compound of Structural Formula 5 |  |  |  |  |  |  |
|  |  | Compound of Structural Formula 6 |  |  |  |  |  |  |
|  |  | Compound of Structural Formula 7 |  |  |  |  |  |  |
|  | Cationic resin | Compound of General Formula 8 | 35.0 |  |  |  | 35.0 |  |
|  |  | Compound of General Formula 9 |  |  |  |  |  |  |
|  |  | Compound of General Formula 10 |  |  |  |  |  |  |
|  | Water-soluble organic solvent | Sodium poly-γ-glutamate |  | 20.0 |  | 20.0 | 20.0 | 20.0 |
|  |  | N-acyl fatty acid-sodium L-glutamate |  |  |  |  |  |  |
|  |  | Sodium N-lauroyl-L-aspartate |  |  |  |  |  |  |
|  |  | Compound of general formula 1 |  |  |  |  |  |  |
|  | Surfactant | Fluorosurfactant | 0.3 | 0.3 | 0.3 | 0.3 | 0.3 | 0.3 |
|  |  | Surfactant of Structural Formula 13 |  |  |  |  |  |  |
|  |  | Polyoxyalkylene alkyl ether |  |  |  |  |  |  |
|  | Foam suppressor | N-octyl-2-pyrrolidone |  |  |  |  |  |  |
|  |  | 2,4,7,9-tetramethyl decane-4,7-diol |  |  |  |  |  |  |
|  |  | 2,5,8,11-tetramethyl-dodecane-5,8-diol |  |  |  |  |  |  |
|  |  | Silicone-based foam suppressor |  |  |  |  |  |  |
|  | Antiseptic mildewcide | LV (S) by Avecia Inc. | 0.1 | 0.1 | 0.1 | 0.1 | 0.1 | 0.1 |
|  | Water | Ion-exchanged water | 64.6 | 79.6 | 69.6 | 79.6 | 44.6 | 49.6 |
|  |  | Total | 100.0 | 100.0 | 100.0 | 100.0 | 100.0 | 100.0 |
|  | Presence/absence of drying step (90° C. for 30 sec.) |  | present | present | present | present | present | present |
| Evaluation item | Image density |  | 1.25 | 1.01 | 1.21 | 0.95 | 1.02 | 1.00 |
|  | Beading rank |  | 5 | 1 | 5 | 1 | 1 | 1 |
|  | Amount of curling [mm] |  | 65 | 56 | 70 | 62 | 18 | 18 |
|  | Foaming property evaluation (30 sec. after foam height) [mL] |  | 90 | 90 | 90 | 90 | 90 | 90 |
|  | Viscosity change ratio under open air [%] |  | 372 | 30 | 235 | 27 | 64 | 41 |
|  | Corrosion level of metallic member |  | B | A | B | A | A | A |

Aspects of the present invention are as follows, for example.

<1> An image forming method, including:

applying a treatment liquid to a recording medium; and applying a recording ink to the recording medium, wherein the treatment liquid is free from a colorant, and contains an organic acid salt or a cationic resin or both thereof; a water-soluble organic solvent, and water, wherein the water-soluble organic solvent contains one or more selected from sodium poly-γ-glutamate, N-acyl fatty acid-sodium L-glutamate, sodium N-lauroyl-L-aspartate, and a compound represented by General Formula 1 below, and wherein the recording ink contains at least a colorant, a water-soluble organic solvent, a surfactant, a carboxyl group-containing resin, and water:

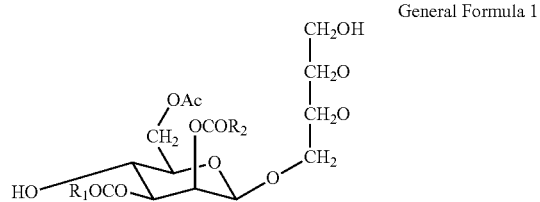

General Formula 1 where in General Formula 1 above, Ac represents an acetyl group, and $R_1$ and $R_2$ each represent a fatty acid residue having 8 to 14 carbon atoms.

<2> The image forming method according to <1>, wherein the organic acid salt satisfies requirements (a) to (c) below:

(a) the organic acid salt includes an organic acid, and one or more neutralizers selected from compounds represented by Structural Formulae 2 to 7 below;

(b) the organic acid includes lactic acid, malic acid, or both thereof and (c) a content of the organic acid in the treatment liquid is from 1% by mass to 30% by mass:

(Structural Formula 2)

(Structural Formula 3)

NH$_2$(CH$_2$)$_2$NHCH$_2$CH$_2$OH (Structural Formula 4)

(Structural Formula 5)

(Structural Formula 6)

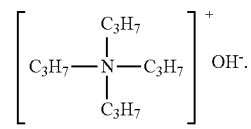
(Structural Formula 7)

<3> The image forming method according to <1> or <2>, wherein the cationic resin includes a repeating unit represented by any of General Formulae 8 to 10 below:

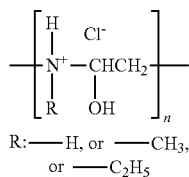
General Formula 8

R: —H, or —CH$_3$, or —C$_2$H$_5$

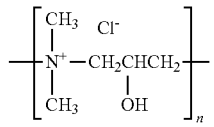
General Formula 9

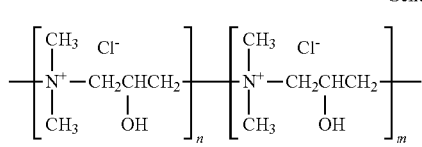
General Formula 10 where in General Formulae 8 to 10 above, n and m represent the number of repeating units, and are integers of 1 or greater.

<4> The image forming method according to any one of <1> to <3>, wherein the treatment liquid further contains a surfactant, and the surfactant includes one or more selected from a compound represented by Structural Formula 13 below and polyoxyalkylene alkyl ether:

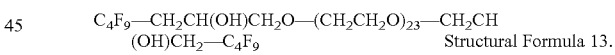
Structural Formula 13.

<5> The image forming method according to any one of <1> to <4>, wherein the treatment liquid further contains a foam suppressor, and the form suppressor includes one or more selected from N-octyl-2-pyrrolidone, 2,4,7,9-tetramethyldecane-4,7-diol, and 2,5,8,11-tetramethyldodecane-5,8-diol.

<6> The image forming method according to any one of <1> to <5>, further including drying after the application of the treatment liquid.

<7> An image forming apparatus, including:

a treatment liquid applying unit configured to apply a treatment liquid to a recording medium; and a recording ink applying unit configured to apply a recording ink to a recording medium, wherein the treatment liquid is free from a colorant, and contains an organic acid salt or a cationic acid or both thereof, a water-soluble organic solvent, and water, the water-soluble organic solvent contains one or more selected from sodium poly-γ-glutamate, N-acyl fatty acid-sodium L-glutamate, sodium N-lauroyl-L-aspartate, and a compound represented by General Formula 1 below, and wherein the recording ink contains at least a colorant, a water-soluble organic solvent, a surfactant, a carboxyl group-containing resin, and water:

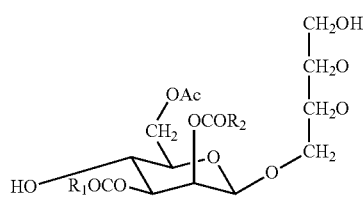
General Formula 1 where in General Formula 1 above, Ac represents an acetyl group, and $R_1$ and $R_2$ each represent a fatty acid residue having 8 to 14 carbon atoms.

<8> The image forming apparatus according to <7>, wherein the organic acid salt satisfies requirements (a) to (c) below:

(a) the organic acid salt includes an organic acid, and one or more neutralizers selected from compounds represented by Structural Formulae 2 to 7 below;

(b) the organic acid includes lactic acid, malic acid, or both thereof, and (c) a content of the organic acid in the treatment liquid is from 1% by mass to 30% by mass:

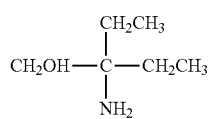 (Structural Formula 2)

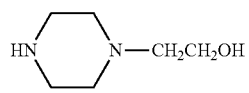 (Structural Formula 3)

 NH$_2$(CH$_2$)$_2$NHCH$_2$CH$_2$OH (Structural Formula 4)

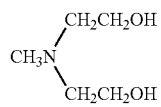 (Structural Formula 5)

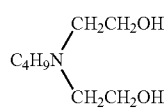 (Structural Formula 6)

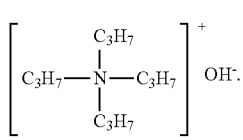 (Structural Formula 7)

<9> The image forming apparatus according <7> or <8>, wherein the cationic resin includes a repeating unit represented by any of General Formulae 8 to 10 below:

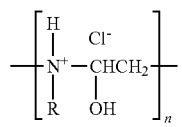
General Formula 8

R: —H, or —CH$_3$, or —C$_2$H$_5$

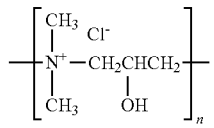
General Formula 9

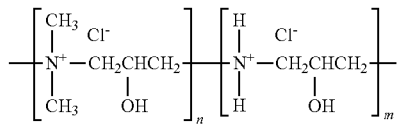
General Formula 10 where in General Formulae 8 to 10 above, n and m represent the number of repeating units, and are integers of 1 or greater.

<10> The image forming apparatus according to any one of <7> to <9>, wherein the treatment liquid further contains a surfactant, and the surfactant includes one or more selected from a compound represented by Structural Formula 13 below and polyoxyalkylene alkyl ether:

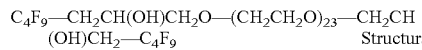
Structural Formula 13.

<11> The image forming apparatus according to any one of <7> to <10>, wherein the treatment liquid further contains a foam suppressor, and the form suppressor includes one or more selected from N-octyl-2-pyrrolidone, 2,4,7,9-tetramethyldecane-4,7-diol, and 2,5,8,11-tetramethyldodecane-5,8-diol.

<12> The image forming apparatus according to any one of <7> to <11>, further including a drying unit between the treatment liquid applying unit and the recording ink applying unit.

This application claims priority to Japanese application No. 2013-148407, filed on Jul. 17, 2013 and incorporated herein by reference.

What is claimed is:

1. An image forming method, comprising:

applying a treatment liquid to a recording medium; and applying a recording ink to the recording medium, wherein the treatment liquid is free from a colorant, and comprises an organic acid salt or a cationic resin or both thereof, a water-soluble organic solvent, and water, and the water-soluble organic solvent comprises one or more selected from sodium poly-γ-glutamate, N-acyl fatty acid-sodium L-glutamate, sodium N-lauroyl-L-aspartate, and a compound represented by General Formula 1 below, and wherein the recording ink comprises a colorant, a water-soluble organic solvent, a surfactant, a carboxyl group-containing resin, and water:

General Formula 1

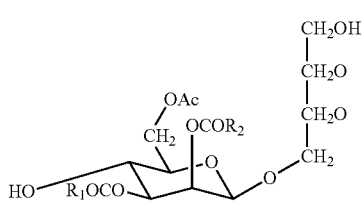

where in General Formula 1 above, Ac represents an acetyl group, and R₁ and R₂ each represent a fatty acid residue having 8 to 14 carbon atoms.

2. The image forming method according to claim 1,
wherein the organic acid salt satisfies requirements (a) to (c) below:
(a) the organic acid salt comprises an organic acid, and one or more neutralizers selected from compounds represented by Structural Formulae 2 to 7 below;
(b) the organic acid comprises lactic acid, malic acid, or both thereof; and
(c) a content of the organic acid in the treatment liquid is from 1% by mass to 30% by mass:

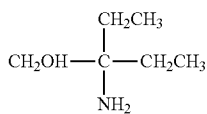
(Structural Formula 2)

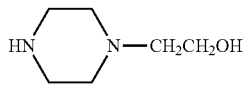
(Structural Formula 3)

NH₂(CH₂)₂NHCH₂CH₂OH   (Structural Formula 4)

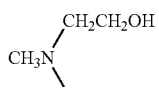
(Structural Formula 5)

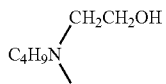
(Structural Formula 6)

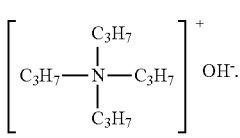
(Structural Formula 7)

3. The image forming method according to claim 1,
wherein the cationic resin comprises a repeating unit represented by any of General Formulae 8 to 10 below:

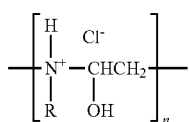
General Formula 8

R: —H, or —CH₃, or —C₂H₅

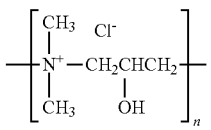
General Formula 9

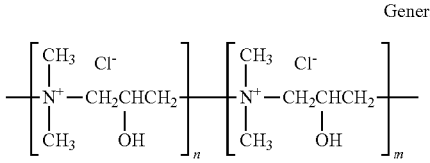
General Formula 10 where in General Formulae 8 to 10 above, n and m represent the number of repeating units, and are integers of 1 or greater.

4. The image forming method according to claim 1,
wherein the treatment liquid further comprises a surfactant, and the surfactant comprises one or more selected from a compound represented by Structural Formula 13 below and polyoxyalkylene alkyl ether:

Structural Formula 13.

$C_4F_9$—$CH_2CH(OH)CH_2O$—$(CH_2CH_2O)_{23}$—$CH_2CH(OH)CH_2$—$C_4F_9$

5. The image forming method according to claim 1,
wherein the treatment liquid further comprises a foam suppressor, and the form suppressor comprises one or more selected from N-octyl-2-pyrrolidone, 2,4,7,9-tetramethyldecane-4,7-diol, and 2,5,8,11-tetramethyldodecane-5,8-diol.

6. The image forming method according to claim 1,
wherein the image forming method further comprises drying after the application of the treatment liquid.

7. An image forming apparatus, comprising:
a treatment liquid applying unit configured to apply a treatment liquid to a recording medium; and
a recording ink applying unit configured to apply a recording ink to a recording medium,
wherein the treatment liquid is free from a colorant, and comprises an organic acid salt or a cationic resin or both thereof, a watersoluble organic solvent, and water, and the water-soluble organic solvent comprises one or more selected from sodium poly-γ-glutamate, N-acyl fatty acid-sodium L-glutamate, sodium N-lauroyl-L-aspartate, and a compound represented by General Formula 1 below, and
wherein the recording ink comprises a colorant, a water-soluble organic solvent, a surfactant, a carboxyl group-containing resin, and General Formula 1

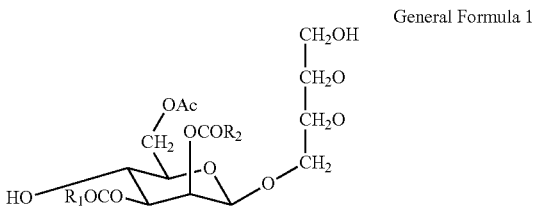

where in General Formula 1 above, Ac represents an acetyl group, and R₁ represents and R₂ each represent a fatty acid residue having 8 to 14 carbon atoms.

8. The image forming apparatus according to claim 7,
wherein the organic acid salt satisfies requirements (a) to (c) below:

(a) the organic acid salt comprises an organic acid, and one or more neutralizers selected from compounds represented by Structural Formulae 2 to 7 below;
(b) the organic acid comprises lactic acid, malic acid, or both thereof; and
(c) a content of the organic acid in the treatment liquid is from 1% by mass to 30% by mass:

(Structural Formula 2)

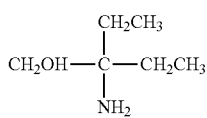

(Structural Formula 3)

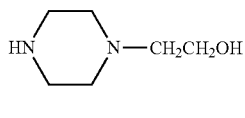

(Structural Formula 4)

NH$_2$(CH$_2$)$_2$NHCH$_2$CH$_2$OH (Structural Formula 5)

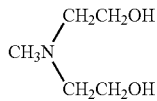

(Structural Formula 6)

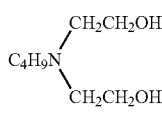

(Structural Formula 7)

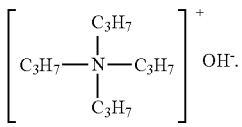

9. The image forming apparatus according to claim 7, wherein the cationic resin comprises a repeating unit represented by any of General Formulae 8 to 10 below:

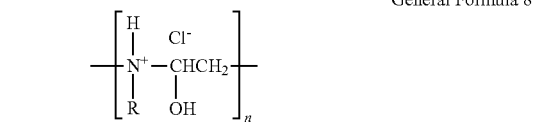
General Formula 8

R: —H, or —CH$_3$, or —C$_2$H$_5$

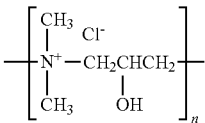
General Formula 9

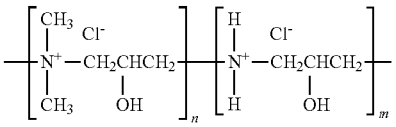
General Formula 10 where in General Formulae 8 to 10 above, n and m represent the number of repeating units, and are integers of 1 or greater.

10. The image forming apparatus according to claim 7, wherein the treatment liquid further comprises a surfactant, and the surfactant comprises one or more selected from a compound represented by Structural Formula 13 below and polyoxyalkylene alkyl ether:

C$_4$F$_9$—CH$_2$CH(OH)CH$_2$O—(CH$_2$CH$_2$O)$_{23}$—CH$_2$CH(OH)CH$_2$—C$_4$F$_9$   Structural Formula 13.

11. The image forming apparatus according to claim 7, wherein the treatment liquid further comprises a foam suppressor, and the foam suppressor comprises one or more selected from N-octyl-2-pyrrolidone, 2,4,7,9-tetramethyldecane-4,7-diol, and 2,5,8,11-tetramethyldodecane-5,8-diol.

12. The image forming apparatus according to claim 7, wherein the image forming apparatus further comprises a drying unit between the treatment liquid applying unit and the recording ink applying unit.

* * * * *